(12) United States Patent
Lowe et al.

(10) Patent No.: US 12,546,848 B2
(45) Date of Patent: Feb. 10, 2026

(54) HYPER-ACCURATE OBJECT-POSITIONING SYSTEM AND METHOD OF SELF-LOCALIZATION USING SAME

(71) Applicant: ZEROKEY INC., Calgary (CA)

(72) Inventors: Matthew William Lowe, Calgary (CA); Guojiang Gao, Calgary (CA); Chris Leskiw, Calgary (CA)

(73) Assignee: ZEROKEY INC., Calgary (CA)

( * ) Notice: Subject to any disclaimer, the term of this patent is extended or adjusted under 35 U.S.C. 154(b) by 340 days.

(21) Appl. No.: 17/910,863

(22) PCT Filed: Mar. 12, 2021

(86) PCT No.: PCT/CA2021/050338
§ 371 (c)(1),
(2) Date: Sep. 12, 2022

(87) PCT Pub. No.: WO2021/179093
PCT Pub. Date: Sep. 16, 2021

(65) Prior Publication Data
US 2023/0105698 A1    Apr. 6, 2023

Related U.S. Application Data

(60) Provisional application No. 62/988,833, filed on Mar. 12, 2020.

(51) Int. Cl.
*G01S 5/02* (2010.01)
(52) U.S. Cl.
CPC ........ *G01S 5/0273* (2013.01); *G01S 5/02213* (2020.05); *G01S 5/02585* (2020.05)

(58) Field of Classification Search
CPC ............... G01S 5/0273; G01S 5/02213; G01S 5/02585; G01S 5/14
See application file for complete search history.

(56) References Cited

U.S. PATENT DOCUMENTS 9,689,958 B1 *  6/2017  Wild ...................... G01S 1/751
9,977,113 B2    5/2018  Dehghanian et al.
(Continued)

OTHER PUBLICATIONS

Canadian Intellectual Property Office (ISR/CA), "International Search Report for PCT/CA2021/050338", Canada, Jun. 17, 2021.
(Continued)

*Primary Examiner* — Marcus E Windrich
(74) *Attorney, Agent, or Firm* — Troutman Pepper Locke, LLP; Tim Tingkang Xia, Esq.

(57) ABSTRACT

An object-positioning system has a plurality of reference devices, one or more target devices at unknown positions and in communication with the plurality of reference devices via one or more wireless signal sets, at least one processing unit; and one or more signal-retransmission devices each in communication with at least a subset of the plurality of reference devices, at least a subset of the one or more target devices, and at least a subset of the at least one processing unit for populating object-positioning related data therebetween. The at least one processing unit is configured for: for each of the one or more target devices, determining the distance between the target device and each of the plurality of reference devices based on the wireless signal set communicated between said reference and target devices, and determining the position of said target device based on the determined distances.

4 Claims, 27 Drawing Sheets

(56) References Cited

U.S. PATENT DOCUMENTS

| | | | |
|---|---|---|---|
| 10,051,599 | B2 | 8/2018 | Lowe et al. |
| 10,061,010 | B2* | 8/2018 | Derom .................... G01S 3/808 |
| 11,573,286 | B1* | 2/2023 | Bao ....................... G01S 5/0205 |
| 2011/0210843 | A1 | 9/2011 | Kummetz |
| 2012/0039310 | A1* | 2/2012 | Dahl ........................ G01S 5/14 |
| | | | 370/338 |
| 2015/0247916 | A1* | 9/2015 | Bartov ................ G01S 5/02585 |
| | | | 455/456.6 |
| 2017/0123044 | A1 | 5/2017 | Dehghanian et al. |
| 2017/0208565 | A1* | 7/2017 | Lowe .................... H04L 1/0054 |
| 2018/0335502 | A1 | 11/2018 | Lowe et al. |
| 2020/0229124 | A1* | 7/2020 | Soriaga ................. H04W 4/023 |

OTHER PUBLICATIONS

Leskiw et al. ZeroKey's Smart Space Indoor Positioning System, ZeroKey White Paper, 2020.

Global Positioning System Standard Positioning Service Performance Standard, 4th Edition, Sep. 2008. Accessed on: Mar. 8, 2020.

Dardari, Davide, Pau Closas, and Petar M. Djurić. "Indoor tracking: Theory, methods, and technologies." IEEE Transactions on Vehicular Technology 64, No. 4 (2015): 1263-1278.

Rai, Anshul, Krishna Kant Chintalapudi, Venkata N. Padmanabhan, and Rijurekha Sen. "Zee: Zero-effort crowdsourcing for indoor localization." In Proceedings of the 18th annual international conference on Mobile computing and networking, pp. 293-304. 2012.

Röbesaat, Jenny, Peilin Zhang, Mohamed Abdelaal, and Oliver Theel. "An improved BLE indoor localization with Kalman-based fusion: An experimental study." Sensors 17, No. 5 (2017): 951.

Kuhn, Michael, Cemin Zhang, Brandon Merkl, Depeng Yang, Yazhou Wang, Mohamed Mahfouz, and Aly Fathy. "High accuracy UWB localization in dense indoor environments." In 2008 IEEE International Conference on Ultra-Wideband, vol. 2, p. 129 132. IEEE, 2008.

Mulloni, Alessandro, Daniel Wagner, Istvan Barakonyi, and Dieter Schmalstieg. "Indoor positioning and navigation with camera phones." IEEE Pervasive Computing 8, No. 2 (2009): 22-31.

Qi, Jun, and Guo-Ping Liu. "A robust high-accuracy ultrasound indoor positioning system based on a wireless sensor network." Sensors 17, No. 11 (2017): 2554.

Medina, Carlos, JoséCarlos Segura, and Angel De la Torre. "Ultrasound indoor positioning system based on a low-power wireless sensor network providing sub-centimeter accuracy." Sensors 13, No. 3 (2013): 3501-3526.

Silva, Bruno, Zhibo Pang, Johan Åkerberg, Jonas Neander, and Gerhard Hancke. "Experimental study of UWB-based high precision localization for industrial applications." In 2014 IEEE International Conference on Ultra-WideBand (ICUWB), pp. 280 285. IEEE, 2014.

Williams, Gareth. "Overdetermined systems of linear equations." The American Mathematical Monthly 97, No. 6 (1990): 511-513.

Leitinger, Erik, Paul Meissner, Christoph Rüdisser, Gregor Dumphart, and Klaus Witrisal. "Evaluation of position-related information in multipath components for indoor positioning." IEEE Journal on Selected Areas in communications 33, No. 11 (2015): 2313 2328.

Gueuning, Francis, Mihai Varlan, Christian Eugene, and Pascal Dupuis. "Accurate distance measurement by an autonomous ultrasonic system combining time-of-flight and phase-shift methods." In Quality Measurement: The Indispensable Bridge between Theory and Reality (No Measurements? No Science! Joint Conference—1996: IEEE Instrumentation and Measurement Technology Conference and IMEKO Tec, vol. 1, pp. 399 404. IEEE, 1996.

* cited by examiner

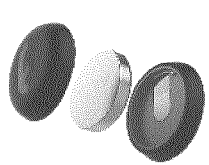  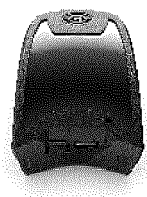    
FIG. 12A    FIG. 12B    FIG. 12C    FIG. 12D
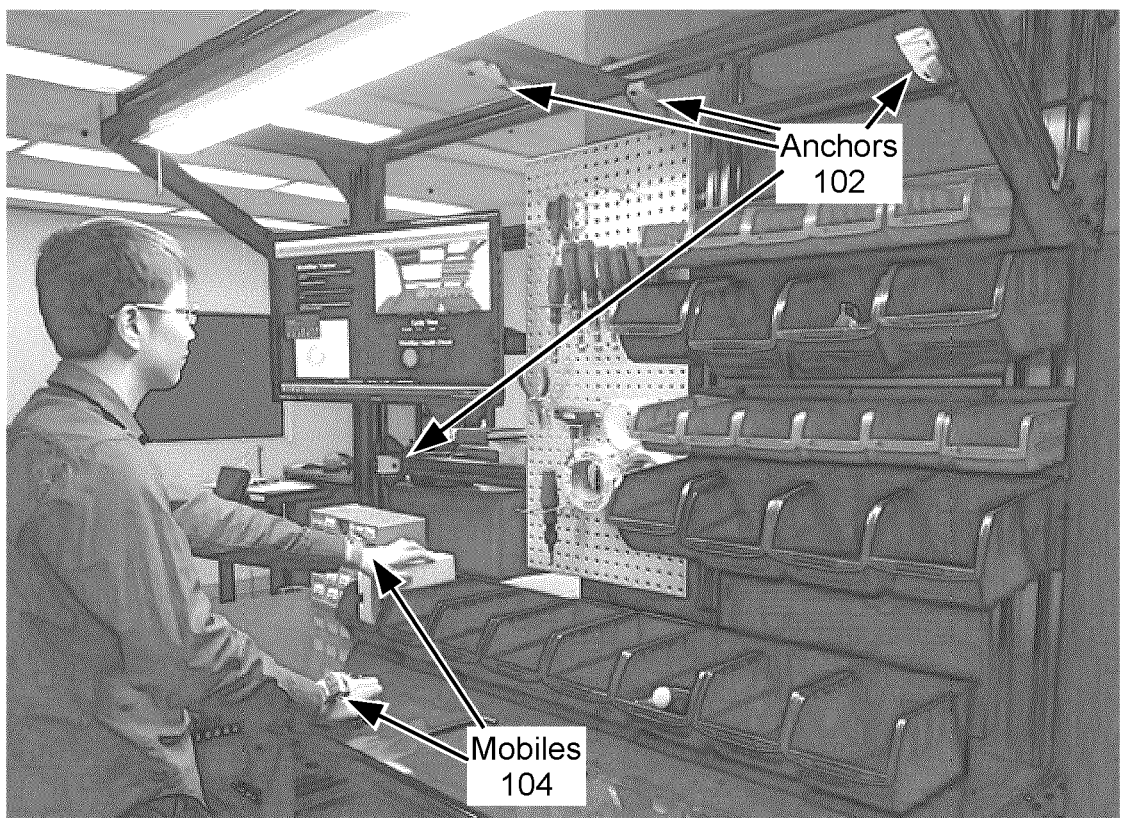
FIG. 13

HYPER-ACCURATE OBJECT-POSITIONING SYSTEM AND METHOD OF SELF-LOCALIZATION USING SAME

CROSS-REFERENCE TO RELATED APPLICATIONS

This application claims the benefit of U.S. Provisional Patent Application Ser. No. 62/988,833, filed Mar. 12, 2020, the content of which is incorporated herein by reference in its entirety.

FIELD OF THE DISCLOSURE

The present invention relates generally to an object-positioning system, and in particular to a hyper-accurate positioning system and a method of localizing reference nodes and target nodes using same.

BACKGROUND

Indoor/outdoor positioning systems are known. For example, one type of outdoor positioning system is a Global Navigation Satellite System (GNSS) such as the Global Positioning System (GPS) of the United States, the Global Navigation Satellite System (GLONASS) of Russia, the Galileo positioning system of the European Union, and the BeiDou Navigation Satellite System of China.

Other examples of indoor/outdoor positioning systems include positioning systems using received signal strength (RSS), inertial navigation systems (INS) using motion sensors (for example, accelerometers) and rotation sensors (for example, gyroscopes) for object positioning, pedestrian dead reckoning (PDR) using accelerometers as a pedometer and magnetometer as a compass for pedestrian navigation, SteamVR® optical position tracking technology developed by Valve Corporation of Bellevue, Washington, U.S.A. (SteamVR is a registered trademark of Valve Corporation), Oculus constellation tracking technology developed by Oculus VR of Irvine, California, U.S.A., and the OPTITRACK® camera-based positioning system developed by NaturalPoint, Inc. of Corvallis, OR, U.S.A. (OPTITRACK is a registered trademark of NaturalPoint, Inc.).

Another type of positioning system is the ultra-wideband (UWB) based system developed by DecaWave Limited of Dublin, Ireland, which uses two-way ranging, Time Difference of Arrival (TDoA), or Phase Difference of Arrival (PDoA) of UWB signals for determining positions of target objects.

While the above-described positioning systems have been successfully deployed and used, they still face various challenges such as:

Multipath;
Laborious setup and calibration procedures;
High cost; and
Low accuracy.

It is therefore a desire to provide a novel high-accuracy positioning system and a method of localizing objects using same.

SUMMARY

According to one aspect of this disclosure, there is provided a hyper-accurate cooperative object-positioning system comprising of a plurality of devices or nodes in wireless and/or wired communication with each other. Some nodes are at known positions and may be used as reference nodes or anchors. Some other nodes may be at unknown positions and may be denoted as target nodes. The system uses the wireless signals transmitted between the plurality of nodes and the positions of the reference nodes for determining positions of one or more target nodes.

In some embodiments, the system may also comprise a plurality of repeaters in communication with at least a subset of the plurality of reference and target nodes, and at least one processing unit for populating object-positioning related data therebetween.

In some embodiments, the system may further comprise one or more gateway devices or nodes in communication with at least a subset of the plurality of reference and target nodes, at least one signal-retransmission device or node, and the at least one processing unit for populating the object-positioning related data therebetween.

In some embodiments, the system may further comprise one or more range finders cooperatively conducting a Simultaneous Localization and Mapping (SLAM) method to self-localize reference and target nodes within a common coordinate system.

According to one aspect of this disclosure, there is provided an object-positioning system comprising: a plurality of reference nodes at known positions; one or more target nodes at unknown positions, said one or more target nodes in communication with the plurality of reference nodes via one or more wireless signal sets; at least one processing unit; and one or more signal-retransmission nodes each in communication with at least a subset of the plurality of reference nodes, at least a subset of the one or more target nodes, and at least a subset of the at least one processing unit for populating object-positioning related data therebetween. The at least one processing unit is configured for: for each of the one or more target nodes, determining the distance between the target node and each of the plurality of reference nodes based on the wireless signal set communicated between said reference and target nodes; and determining the position of said target node based on the determined distances.

In some embodiments, the object-positioning system further comprises: one or more gateway nodes in communication with at least a subset of the plurality of reference nodes, at least a subset of the signal-retransmission nodes, and the at least one processing unit for populating the object-positioning related data therebetween.

According to one aspect of this disclosure, there is provided an object-positioning system comprising: at least one processing unit; a plurality of reference nodes having a coordinate system associated therewith, the plurality of said reference nodes being located at unknown positions; one or more target nodes being located at unknown positions, said one or more target and said plurality of reference nodes further comprising a range finder such as Applicant's U.S. Pat. No. 10,448,357, the content of which is incorporated herein by reference in its entirety, and said reference and target nodes being configured for measuring the distance between all or a subset of the plurality of reference nodes, and further conducting one or more distance measurements between the one or more target nodes and all or a subset of the plurality of reference nodes. The at least one processing unit is configured for: estimating the position of the reference nodes whose position is unknown in said coordinate system based on the distances between the plurality of reference nodes and the distances between the plurality of reference nodes and the one or more target nodes; and determining the position of said reference nodes and target nodes in said coordinate system based on the determined distances.

In some embodiments, the object-positioning system further comprises one or more gateway nodes in communication with at least a subset of the plurality of reference nodes, at least a subset of the signal-retransmission nodes, and the at least one processing unit for populating the object-positioning related data therebetween.

BRIEF DESCRIPTION OF THE DRAWINGS

FIGS. 8A and 8B show multiple range measurements used to narrow the location estimate of the mobile node, wherein FIG. 8A shows a location estimate within a determined area and FIG. 8B shows a location estimate at a single location after optimization.

FIGS. 12A to 12D show various form factors of Applicant's Indoor Positioning Systems (IPS) solution, wherein FIG. 12A shows Applicant's coin-cell powered mobile/node, FIG. 12B shows Applicant's Universal Serial Bus (USB) or battery powered anchor, FIG. 12C shows Applicant's USB or battery-powered mobile, and FIG. 12D shows Applicant's Power-over-Ethernet (POE) anchor.

FIG. 13 shows an assembly station deployment where anchors track hands using wrist mounted mobiles.

DETAILED DESCRIPTION

Object-Positioning System

A multilateration (MLAT) object-positioning system generally involves ranging, that is, measuring distances between a set of nodes. Herein, a node is a functional component, module, device, or the like, of the object-positioning system and may be fixed, relocatably positioned, or movably positioned in a site. A node may comprise circuitry (which may comprise one or more individual circuits and/or integrated circuits) such as electrical circuitry and/or optical circuitry, and may communicate with other nodes via suitable wired or wireless technologies using suitable signals such as electrical signals, radio-frequency (RF) signals, optical signals, acoustic signals, and/or the like.

Figure 1:
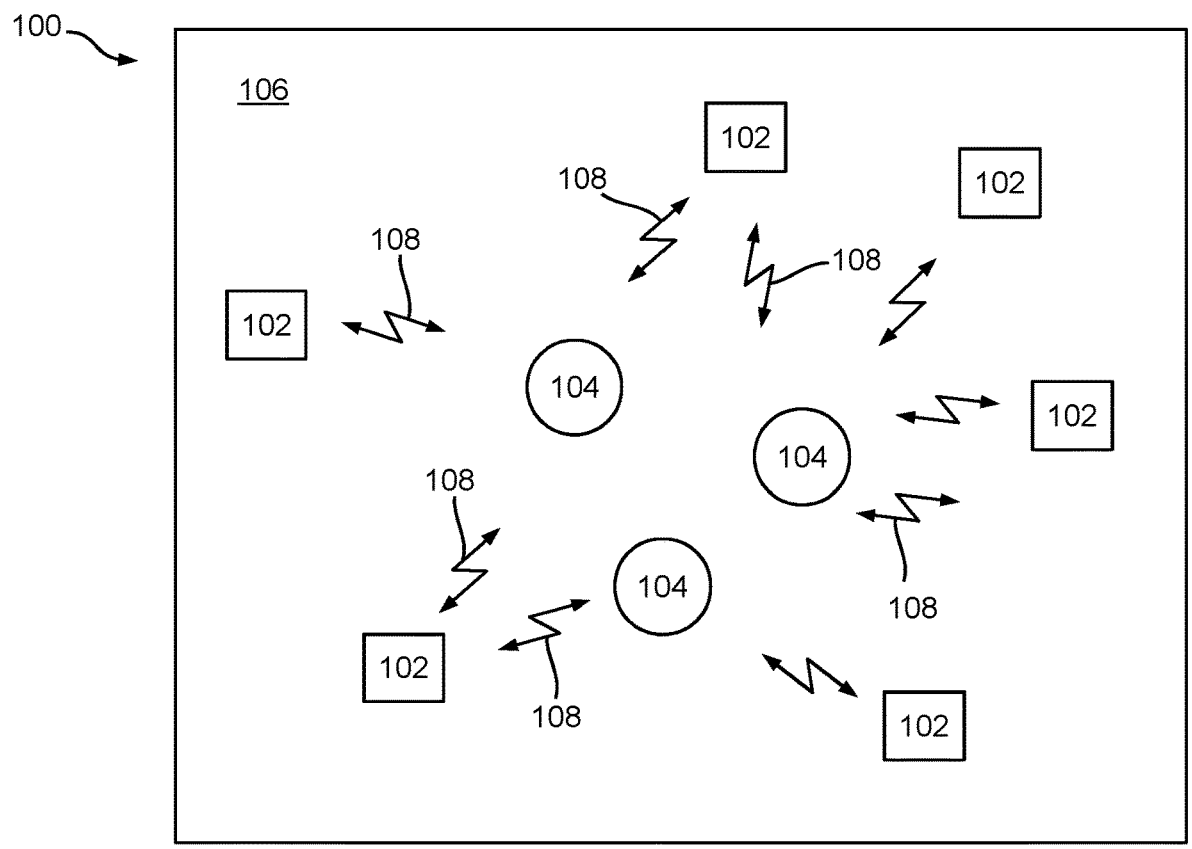
FIG. 1 is a schematic diagram illustrating a positioning system having one or more reference devices and one or more target devices in a site, according to one embodiment of the present disclosure.

FIG. 1 is a schematic diagram showing a positioning system 100 having one or more reference devices and one or more target devices in a site, according to one embodiment of the present disclosure.

As shown, the system 100 comprises a plurality of nodes 102 and 104. At least some of the nodes 102 and 104 each comprises a range finder for determining the point-to-point range between itself and nearby nodes. Examples of such nodes with range finders are disclosed in Applicant's U.S. Pat. No. 10,448,357, the content of which is incorporated herein by reference in its entirety. Moreover, at least some of the nodes 102 and 104 may further comprise a processing unit (also denoted a "processor" or a "processing structure") for executing instructions and a bi-directional wireless radio for system communication. Herein, the processing unit may be in the form of electrical circuitry, optical circuitry, or a combination thereof.

In various embodiments, the nodes 102 and 104 may be categorized as one or more reference devices 102 (also denoted "anchors") and one or more target devices 104 (also denoted "mobiles") deployed in a site 106. The reference devices 102 may be at fixed locations or movable and the locations thereof may be predetermined, determined via a calibration process, and/or via a ranging and/or positioning method such as the method described herein, the method disclosed in Applicant's U.S. Pat. No. 10,448,357, and/or any other suitable methods. The target devices 104 are generally movable and the positions thereof may be determined as described in this disclosure. In some embodiments, a reference device 102 may be considered or become a target device for determining the position thereof. In some embodiments, a target device 104, after its position is determined, may be used as a reference device for determining positions of other target devices.

In this embodiment, the target devices 104 transmit a wireless signal set 108, and the reference devices 102 receive the wireless signal set 108. Thus, the reference devices 102 communicate with target devices 104 via the wireless signal set 108 for determining the ranges of the target devices 104. Herein, the range of an object refers to at least the distance between the object and a reference point, for example, a reference device 102.

In this embodiment, the one or more reference devices 102 are deployed at known locations of the site 106 and may be, for example, one or more devices specifically designed for the purposes described herein, one or more WI-FI® access points (WI-FI is a registered trademark of Wi-Fi Alliance, Austin, TX, USA), one or more BLUETOOTH® access points (BLUETOOTH is a registered trademark of Bluetooth Sig. Inc., Kirkland, WA, USA), one or more 5G® base stations, and/or the like. As will be described in more detail below, each reference device 102 also comprises an acoustic transducer capable of transmitting and receiving acoustic signals.

The target devices 104 are associated with respective movable objects, such as humans, lanyards, ID badges, tools, hardhats, shopping carts, packages, robots, autonomous guided vehicles (AGV's), a user's hands, and/or the like, thereby movable within the site 106. The target devices 104 may be any devices having the functionality as described below and suitable for associating with movable objects, for example, signal-receiving devices specifically designed for the purposes described herein, smartphones such as Apple® iPhone® (Apple and iPhone are registered trademarks of Apple Inc., Cupertino, California, U.S.A.), Android™ phones (Android is a trademark of Google LLC, Mountain View, California, U.S.A.), Windows® phones (Windows is a registered trademark of Microsoft Corporation, Redmond, Washington, U.S.A.) and other smartphones, tablets such as Apple® iPad® (iPad is registered trademarks of Apple Inc., Cupertino, California, U.S.A.), Android™ tablet, Microsoft® (Microsoft is a registered trademark of Microsoft Corporation, Redmond, Washington, U.S.A.) tablet and other tablets, laptops, Personal Digital Assistant (PDA), video game controllers, human-machine interface devices, three-dimensional (3D) interface devices for virtual reality applications, augmented reality devices such as the HoloLens® (HoloLens is a registered trademark of Microsoft Corporation, Redmon, Washington, U.S.A.), a heads-up displays such as Google Glass, and/or the like.

In this embodiment, the wireless signal set 108 transmitted between a reference device 102 and a target device 104 comprises at least a first-type, high-speed wireless signal (also denoted "a first-speed signal" hereinafter) such as a radio-frequency (RF) signal, for example, a WI-FI® signal, a BLUETOOTH® signal, an Enhanced ShockBurst® (ShockBurst is a registered trademark of Nordic Semiconductor ASA, Trondheim NORWAY) signal, a 5G cellular signal, or the like, and a second-type, low-speed wireless signal (also denoted "a second-speed signal" hereinafter) such as an acoustic signal.

As those skilled in the art appreciate, in various embodiments, a reference device 102 may simultaneously communicate with one or more target devices 104, and a target device 104 may simultaneously communicate with one or more reference devices 102. Of course, there may exist, at least in some time periods, one or more reference devices 102 that do not communicate with any target device 104; and there may also exist, at least in some time periods, one or more target devices 104 that do not communicate with any reference device 102.

Suitable signal-multiplexing technologies, such as frequency-division multiplexing, time-division multiplexing, code-division multiplexing, and/or the like, may be used for communication between one or more reference devices 102 and one or more target devices 104. As many of these signal-multiplexing technologies are known in the art, and as new signal-multiplexing technologies are equally applicable to the positioning system disclosed herein, the description in the following only uses simple system descriptions of reference devices 102 communicating with target devices 104 as an example for illustrative purposes.

Figure 2:
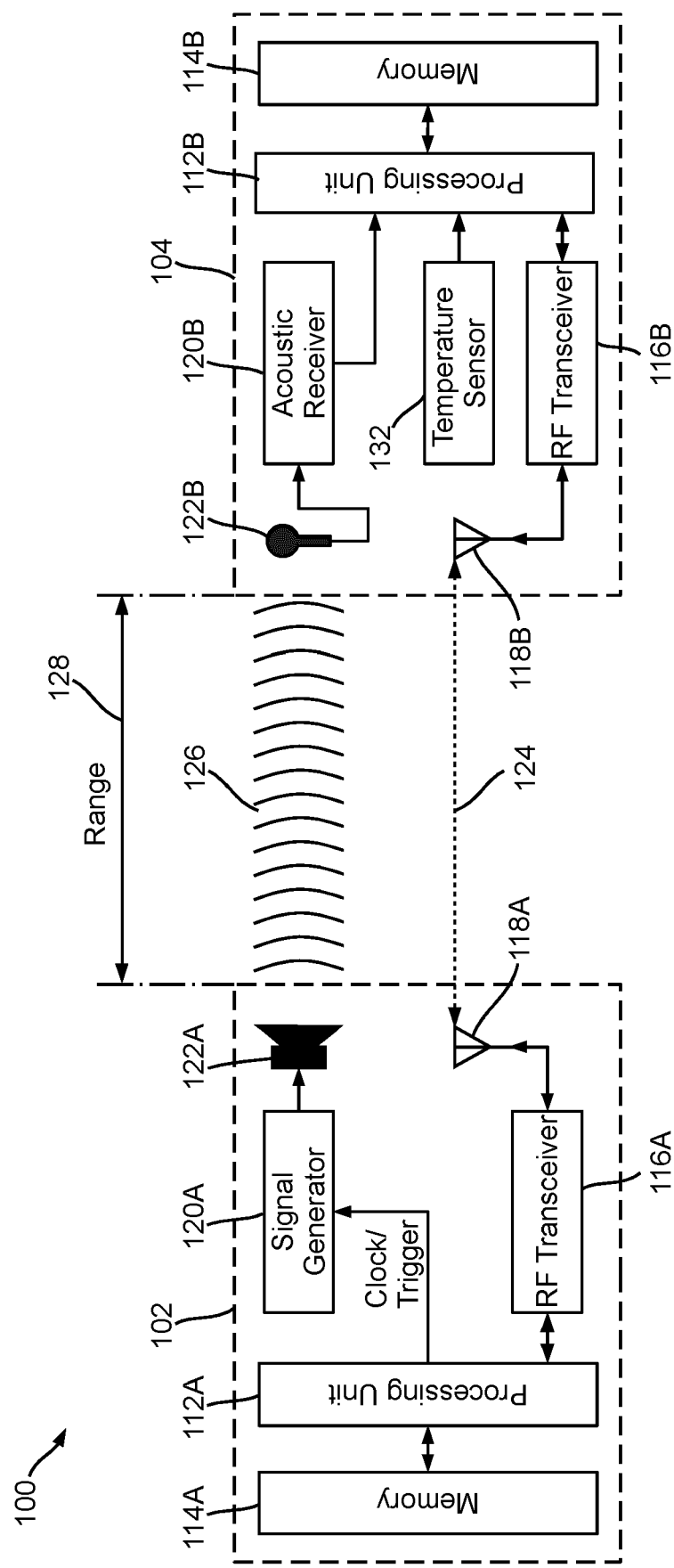
FIG. 2 is a schematic diagram showing the determination of range between a reference device and a target device of the system of FIG. 1.

As shown in FIG. 2, a reference device 102 comprises a processing unit 112A coupled to and controlling, via a bus or individual circuits (not shown), a memory component 114A, and a set of signal transmitters including an RF transceiver 116A, a signal generator 120A, and an acoustic transducer 122A (such as a speaker). The RF transceiver 116A is coupled to an antenna 118A for communicating with the target device 104 via a high-speed wireless signal such as an RF signal 124. As is known in the art, an RF transceiver is capable of transmitting and receiving an RF signal.

The signal generator 120A is coupled to the acoustic transducer 122A for transmitting a low-speed wireless signal such as an acoustic signal 126. In this embodiment, the signal generator 120A comprises a digital to analog converter (DAC), generating an analog signal to drive the transducer 122A and to produce the low-speed wireless signal 126.

In various embodiments, the reference device 102 may further comprise other suitable components and circuitry, depending on the implementation. For example, in some embodiments, the reference device 102 may comprise suitable signal-processing components and circuitry for processing the RF and/or acoustic signals for transmission. In another example, the reference device 102 may comprise suitable signal-processing components and circuitry for filtering the output of the signal generator 120A.

From a functionality point of view, the processing unit 112A is also denoted as the transmitter logic layer. The RF transceiver 116A, antenna 118A, signal generator 120A, and acoustic transducer 122A are collectively denoted as the transmitter physical layer.

Correspondingly, the target device 104 comprises a processing unit 112B coupled to and controlling, via a bus or individual circuits (not shown), a memory component 114B, and a set of signal receivers including an RF transceiver 116B, and an acoustic receiver 120B. The RF transceiver 116B is also coupled to an antenna 118B for communicating with the reference device 102 via the RF (wireless) connection 124 (that is, the RF signal 124; hereinafter the terms "RF signal" and "RF connection" may be used interchangeably for simplicity). The acoustic receiver 120B is also coupled to an acoustic transducer 122B such as a microphone for receiving the acoustic signal transmitted from the reference device 102. In this embodiment, the acoustic receiver 120B comprises an analog to digital converter (ADC), converting the output of the microphone 122B to a digital signal for further processing. In some embodiments, the target device 104 further comprises a temperature sensor 132.

From a functionality point of view, the processing unit 112B is also denoted as the receiver logic layer. The RF transceiver 116B, antenna 118B, acoustic receiver 120B, and acoustic transducer 122B are collectively denoted as the receiver physical layer.

Herein, each of the processing units 112A and 112B may be a specially designed controller chip using, for example, a programmed field-programmable gate array (FPGA), an application-specific integrated circuit (ASIC), and/or the like. Alternatively, each of the processing units 112A and 112B may be one or more single-core or multiple-core computing processors, such as Intel® microprocessors (Intel is a registered trademark of Intel Corporation, Santa Clara, California, U.S.A.), AMD® microprocessors (AMD is a registered trademark of Advanced Micro Devices, Inc., Santa Clara, California, U.S.A.), ARM® microprocessors manufactured by a variety of manufactures under the ARM® architecture (ARM is a registered trademark of ARM Ltd., Cambridge, UK), AVR® microcontrollers (AVR and Atmel are registered trademarks of Atmel corporation, San Jose, CA, USA), and/or the like. Each of the memory components 114A and 114B may be RAM, ROM, EEPROM, solid-state memory, hard disks, CD, DVD, flash memory, and/or the like.

The reference device 102 and the target device 104 use an RF signal 124 and an acoustic signal 126 for measurement of the range 128 therebetween. In this embodiment, the reference device 102 and the target device 104 may also use the RF connection 124 for other communication purposes, such as sending and receiving commands and data to/from each other. However, those skilled in the art appreciate that, in some alternative embodiments, the RF connection 124 shown in FIG. 2 may be used for range measuring only, and the reference device 102 and the target device 104 do not communicate with each other for other purposes. In some other embodiments, the RF connection 124 shown in FIG. 2 may be used for range measuring only, and the reference device 102 and the target device 104 may use a different wireless means, for example, a different wireless channel and/or a different wireless communication technology, for communicating with each other for other purposes such as sending and receiving commands and data to/from each other. As an example, in one embodiment, the reference device 102 and the target device 104 use a an Enhanced ShockBurst™ signal as the RF signal 124 for range measuring, and use a BLUETOOTH® connection for sending and receiving commands and data to/from each other.

Figure 3:
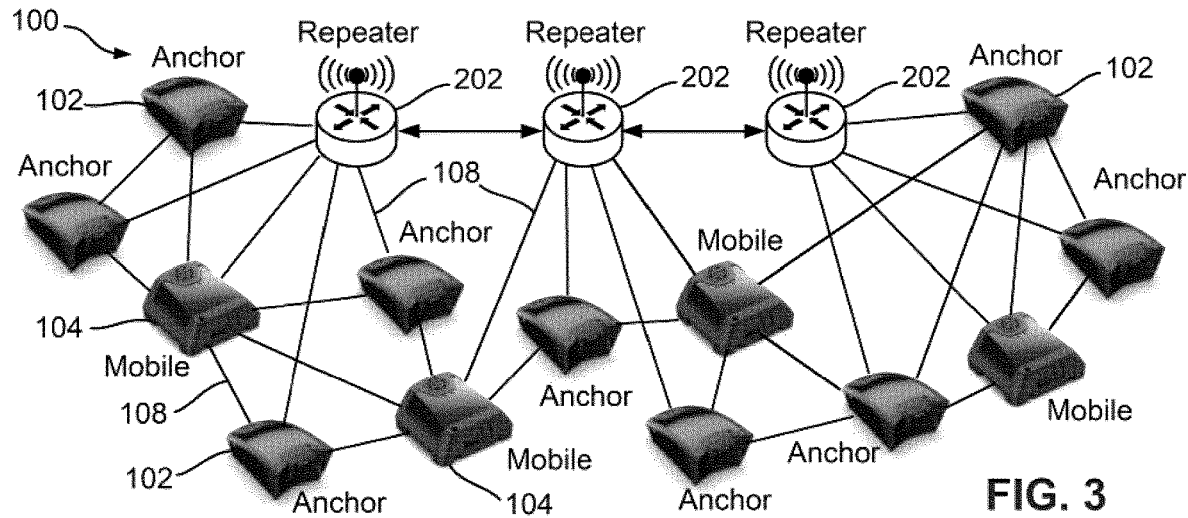
FIG. 3 is a schematic diagram illustrating a positioning system having one or more reference devices, one or more target devices, and a plurality of repeaters in a site, according to another embodiment of the present disclosure.

FIG. 3 is a schematic diagram illustrating a positioning system 100 according to another embodiment of the present disclosure. The positioning system 100 in this embodiment is similar to that shown in FIG. 1 and comprises one or more reference devices or anchors 102, one or more target devices or mobiles 104, and one or more repeaters 202 in a site. Herein, a repeater 202 is a signal-retransmission node or device receiving one or more signals from one or more first devices and retransmitting the received one or more signals to one or more second devices. In some embodiments, a repeater 202 may form part of a reference or target device 102/104. In other words, the reference or target device 102/104 may comprise the repeater's functionalities and act as a repeater 202 when needed.

In this embodiment, the repeaters 202 collaborate with each other and populate ranging/positioning information and observables of the nodes 102 and/or 104 such as ranges, positions, temperatures, Received Signal Strength Indicators (RSSIs), and/or the like throughout the system 100 as needed, for example, transmitting the ranging/positioning information and observables of one or more nodes 102/104 to one or more other repeaters 202', one or more other nodes 102'/104', or to one or more servers (not shown).

Figure 4:
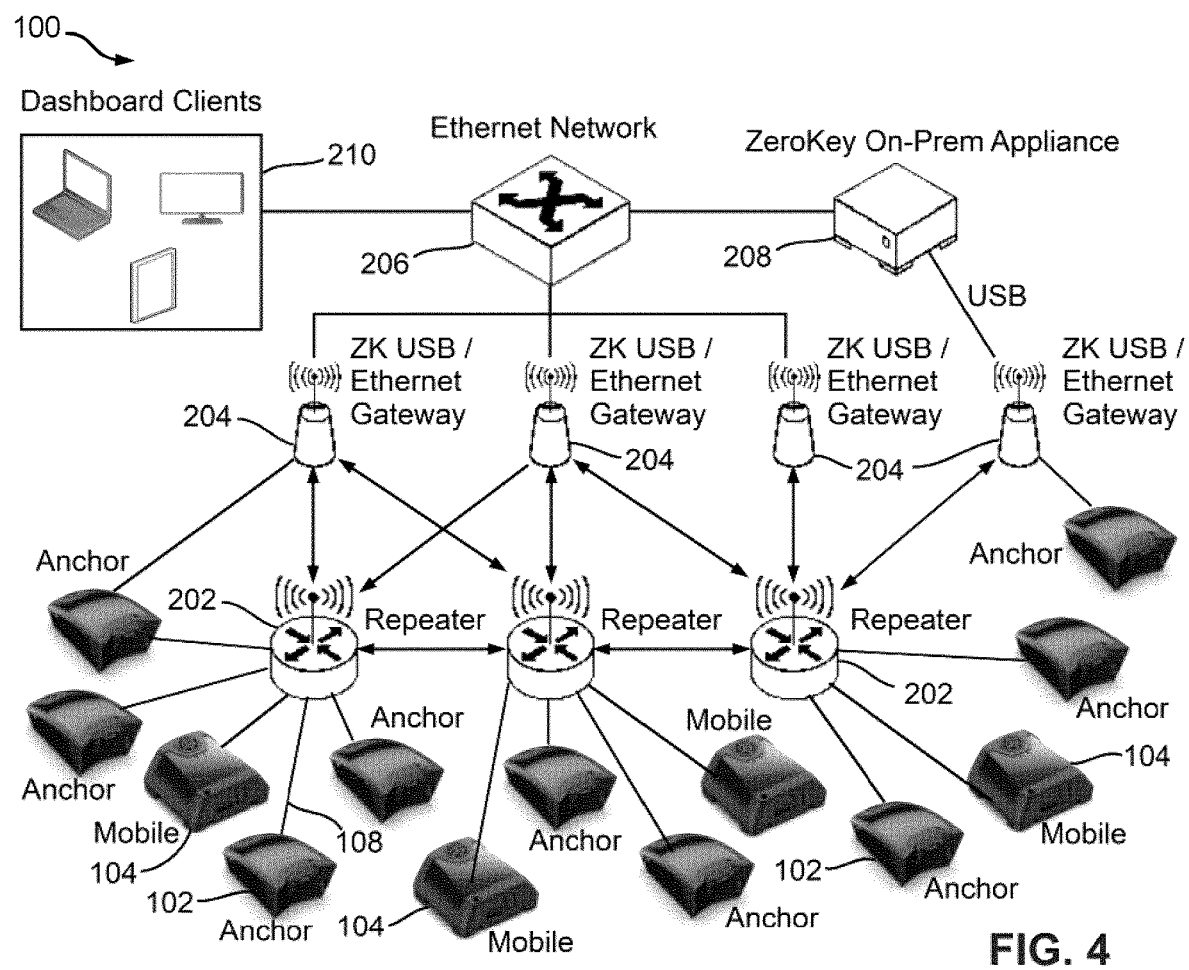
FIG. 4 is a schematic diagram illustrating a positioning system having one or more reference devices, one or more target devices, a plurality of repeaters, and one or more gateways in a site, according to yet another embodiment of the present disclosure.

FIG. 4 is a schematic diagram illustrating a positioning system 100 according to another embodiment of the present disclosure. The positioning system 100 in this embodiment is similar to that shown in FIG. 1 and comprises one or more reference devices or anchors 102, one or more target devices or mobiles 104, a plurality of repeaters 202, and one or more gateway nodes or devices (or simply "gateways") 204 in a site. Depending on implementation, the gateways 204 may be Ethernet gateways, USB gateways, and/or any suitable types of gateways.

The one or more gateways 204 relay data and commands between the system network 206 and one or more servers 208. The servers 208 may further comprise a database, processing engine, and an application programming interface (API). Data is further accessible to end-users via client computing devices 210 through a dashboard website. Those skilled in the art appreciate that considerable variations of the server 208 and database architecture exist (for example, cloud deployment, on-premises deployment, edge deployment, and/or the like) and that those variations do not deviate from the scope of the disclosure herein.

In some embodiments, the target nodes 104 in the network calculate their positions locally and then relay the calculated positions through the network 206 to the server 208. In other embodiments, the target nodes 104 in the network do not calculate their positions. Rather, the node 102 and/or 104 may transmit their observables (range, signal waveform, temperature, RSSI, and/or the like) to the server 208, and the server 208 calculates the positions of the target nodes 104.

In one embodiment, the reference node 102 further comprises an Ethernet port and associated circuitry for communicating with an Ethernet network and is in communication with one or more servers through said Ethernet network. In some embodiments, the Ethernet port is further configured for receiving power via the Power-over-Ethernet standard. In other embodiments, the reference node 102 comprises two Ethernet ports for connecting with an internal Ethernet switch or hub, one for upstream communication and/or power, and the other one to provide downstream Ethernet communication and/or supply power to other reference nodes 102 in a daisy chain configuration.

In another embodiment, the initial positions of reference nodes 102 and target nodes 104 are unknown. The system 100 shown in FIGS. 1 and 2 establishes a common coordinate system for the nodes 102 and 104, and uses a calibration process 300 shown in FIGS. 5A and 5B to simultaneously localize the positions of the reference nodes 102 and optionally target nodes 104 using a Simultaneous Localization and Mapping (SLAM) method described herein.

Figure 5A:
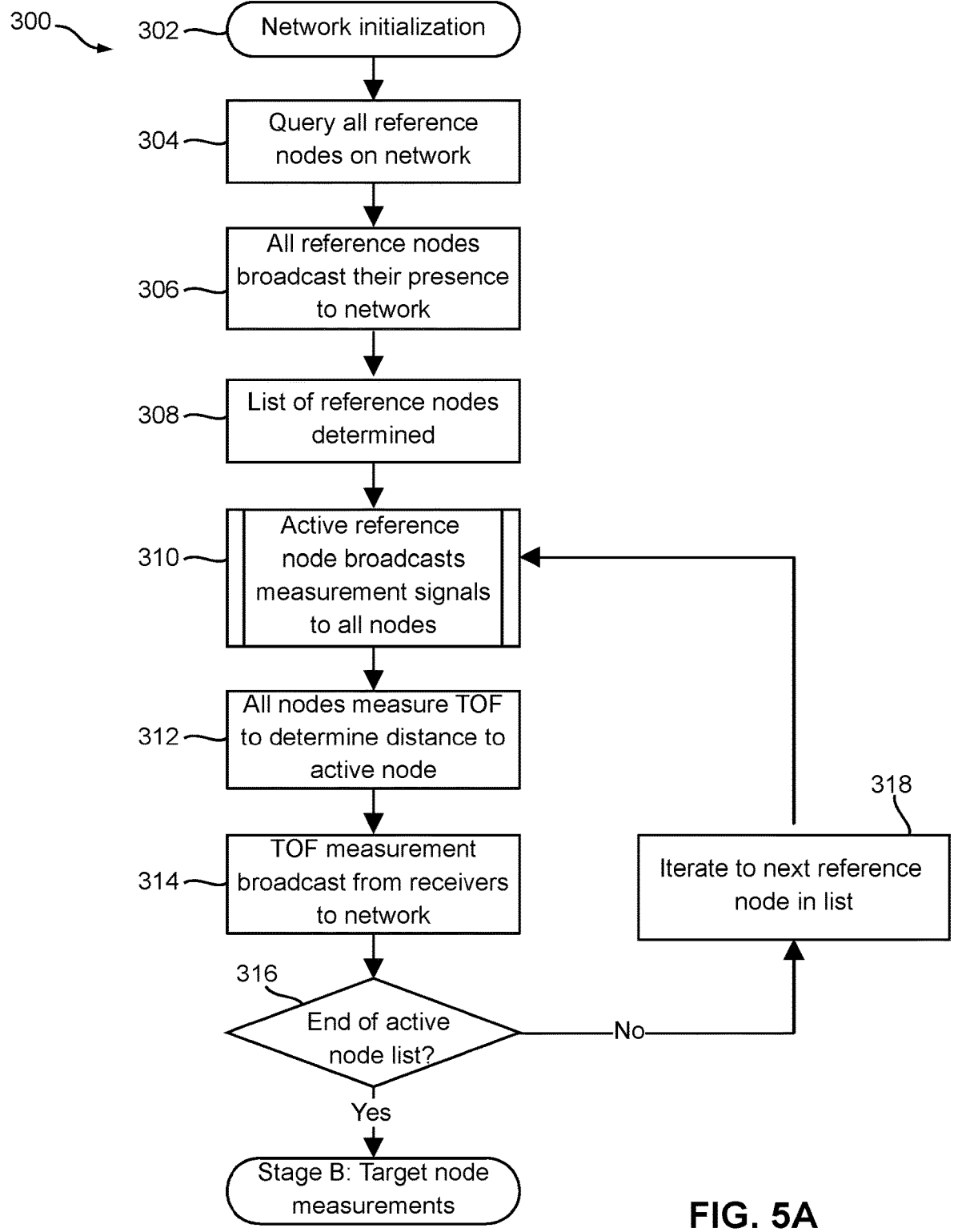
FIGS. 5A and 5B are a flowchart showing the steps of a Simultaneous Localization and Mapping (SLAM) method.
Figure 5B:
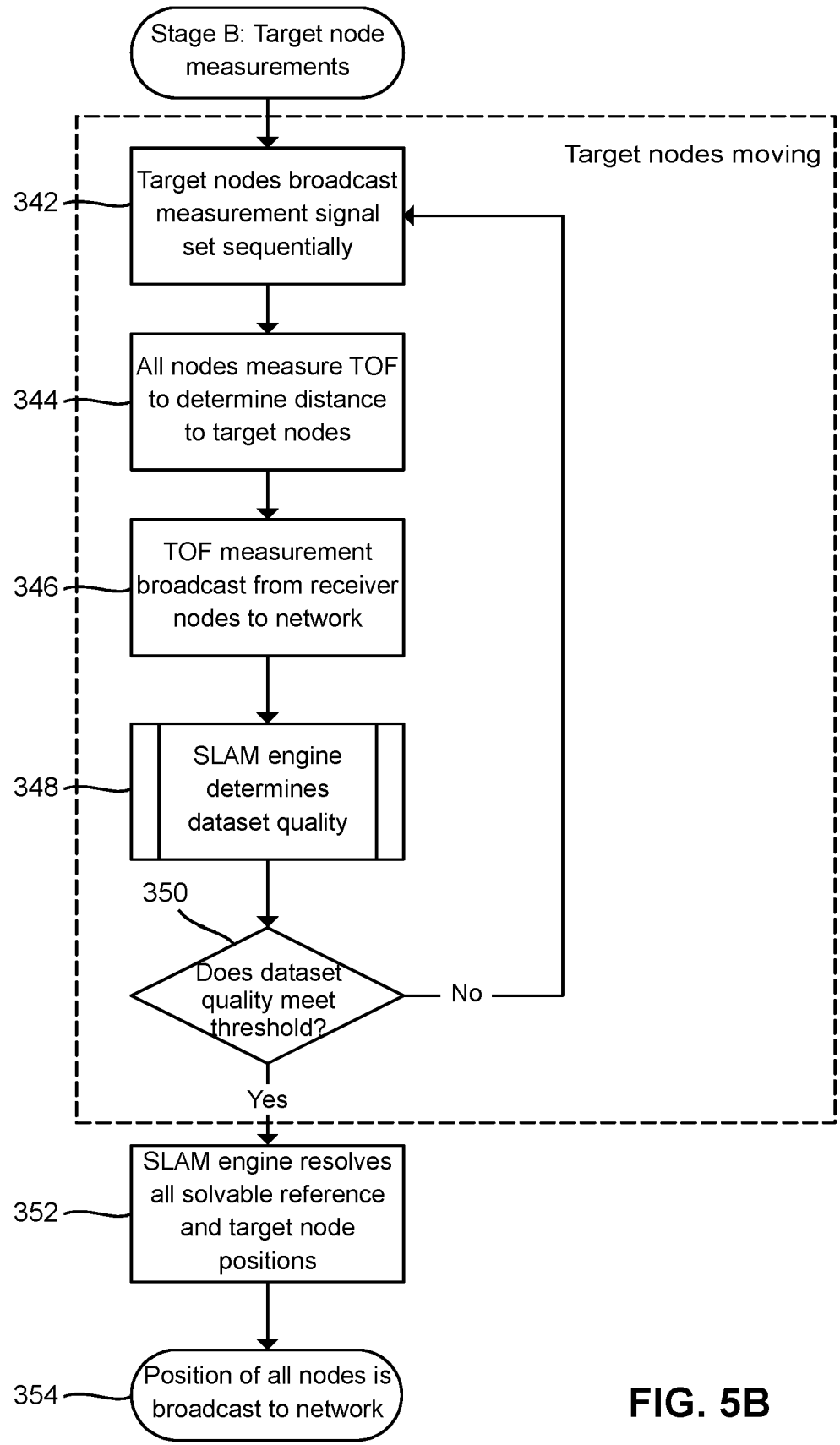

With the process 300 shown in FIGS. 5A and 5B, the system 100 first initializes the network (step 302) to establish ranging communication between the reference nodes 102. Then, a controlling device such as a server queries all reference nodes 102 on the network (step 304), and in response, all reference nodes 102 within the system 100 broadcast their presence (step 306). After a predefined timeout period, the list of responding reference nodes 102 is deterministically ordered, for example, by sorting the reference nodes 102 by their MAC addresses (step 308).

At step 310, a selected reference node 102 (also denoted an "active reference node") in the deterministic list broadcasts measurement signals to all other nodes to allow receiver nodes (that is, other reference nodes 102) to establish time-of-flight (TOF) measurements. At step 312, all receiver nodes measure the TOFs and determine the ranges to the transmitting active node. At step 314, the range measurements and other observables (for example, temperature measurements, RSSI, signal waveforms, and/or the like)

are broadcast from the receiver nodes to the controlling device (for example, the server) via the network.

The system 100 checks if all nodes in the deterministic list have broadcast their measurement signals (step 316). If not, the process 300 selects another reference node from the deterministic list (that is, making it the active node) and then repeats the process with the newly selected node at step 310.

If all nodes in the deterministic list have broadcast their measurement signals the system progresses to a secondary stage shown in FIG. 5B, where one or more target nodes 104 begin transmitting measurement signals in a sequential fashion (step 342) and all reference nodes 102 measure TOF to determine their distance to the broadcasting target node (step 344). The target nodes move throughout the coverage area (for example, the site) while broadcasting its measurement signals (repeatedly) to create several spatially diverse measurement sets from unique positions. With each measurement signal set transmitted by a target node, all receiving nodes compute the TOF and determine a range to the target node for that particular epoch. After each measurement epoch, the range measurement along with other observable data (e.g. temperature, RSSI, signal wave form, etc.) is broadcast back to the controlling device via the network (step 346), which checks the complete dataset across all epochs for its overall quality (step 348). If the dataset does not contain enough data for valid resolution of reference node positions, or does not otherwise meet a preset quality threshold sufficient to resolve positions of the reference nodes to within a certain maximum allowable error (the "No" branch of step 350), the process 300 loops back to step 342. Once sufficient data quality has been achieved (the "Yes" branch of step 350), a solver engine operating on the controlling device determines the positions of all reference nodes (step 352) using the least squares method (see equations 6-12), though many methods are known and may be alternatively used to solve or estimate the solution to the arising system of equations, such as the gradient descent method and the like. In some embodiments, only the position of reference nodes with sufficient data to be solved are determined and some reference nodes remain unfixed. In some embodiments, the RSSI observables transmitted from the receiving nodes to the server are stored in a database or other memory along with the determined positions, and/or are processed to form an RSSI fingerprint.

At step 354, the determined positions are broadcast to the network and the system initialization is complete. The process 300 then ends.

In the process 300, it is not necessary for each node to obtain the ranges to all other nodes, however it is necessary that more range measurements are obtained than the number of unknown variables of the system (for example, the x, y, and z coordinates of each node).

In some embodiments, in the first stage of the process 300 shown in FIG. 5A, some or all target nodes may also respond to the query (step 304) and be included in the deterministic list, thereby being involved in the first stage of the calibration.

In some embodiments, the calibration process 300 is performed when a reference node 102 is moved or relocated.

A similar but alternative method of conducting the Simultaneous Localization and Mapping method is sometimes preferable. In this secondary variant of the method, steps 308 to 318 of the process 300 are skipped, and no reference node to reference node measurements are performed. This may be desirable in the event that reference nodes are too far apart beyond the supported maximum ranging distance, or if obstructions prevent direct range measurements, or in situations with unusually poor multipath conditions. In this case, the lack of reference node to reference node ranges may sometimes give rise to solution ambiguities, depending on the geometric condition created by the actual reference node locations. These ambiguities are resolved or estimated by instructing the user to constrain the movement of the target nodes 104 during the initialization process steps 342 to 350, by for example keeping the height of the node consistent to within +/−0.5 m.

After system initialization, the reference nodes have been self-localized within a common coordinate system, however it is often desirable and useful to transform that coordinate system to another coordinate system, such as a building coordinate system or the Earth coordinate system. Well known methods in the art are employed to determine common control points in both coordinate systems and derive the transformation.

As described in the Applicant's U.S. Pat. No. 10,448,357, temperature measurements may be collected as part of the range-finding process to correct for variations in the speed of sound. However, it is well known that stratification of air within buildings leads to a non-linear thermal gradient, thereby affecting the average temperature of the air column between two nodes 102/104.

Figure 6:
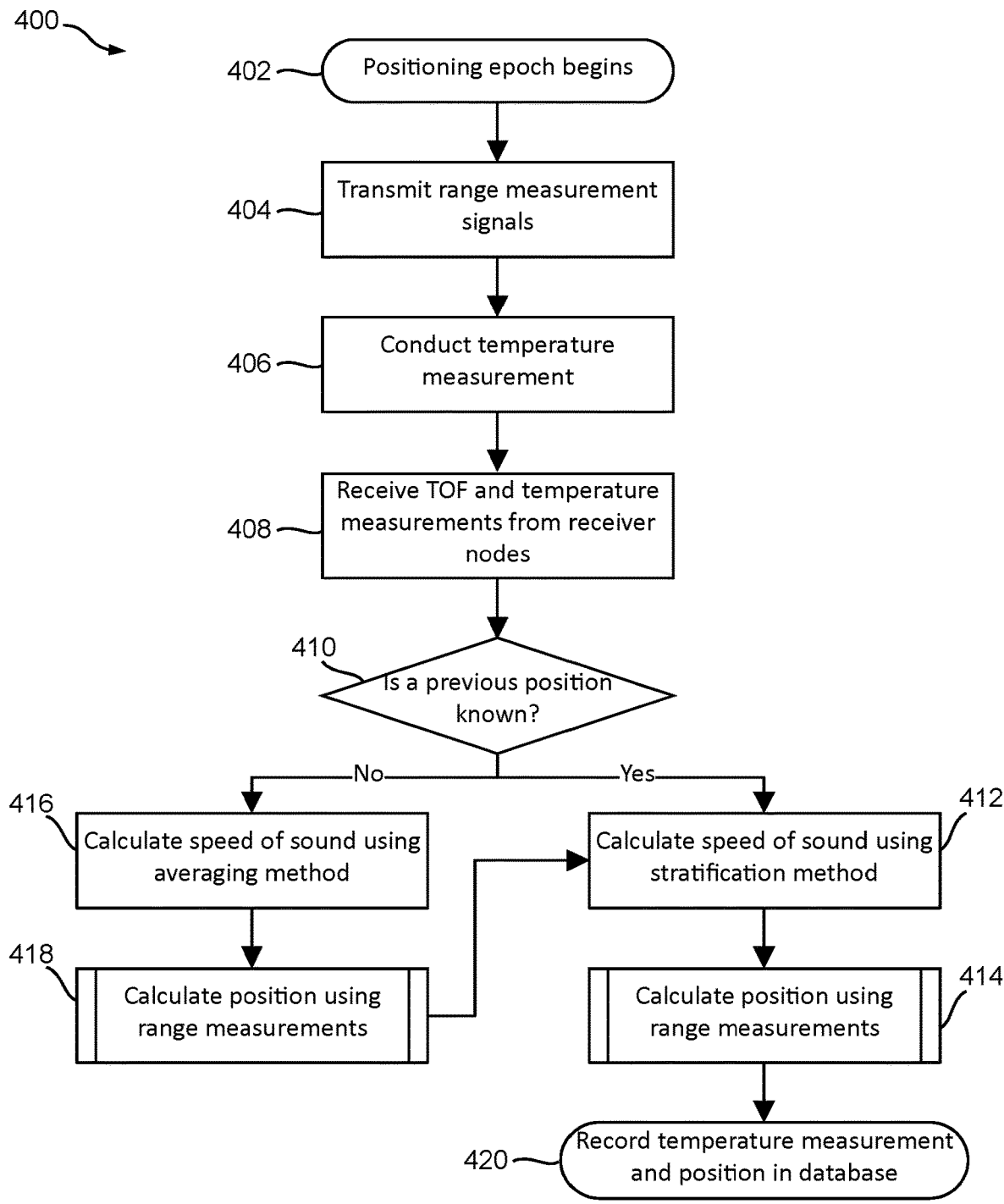
FIG. 6 is a flowchart showing the steps of a process for estimating the speed of sound.

A more accurate method of estimating the speed of sound may be used. FIG. 6 is a flowchart showing the steps of a process 400 for estimating the speed of sound. The process shown 400 collects temperature measurements at various points in space. Initially, the traditional method of temperature correcting the speed of sound is employed, as described in Applicant's U.S. Pat. No. 10,448,357. Then, the process 400 employs an additional step of storing the temperature measurements in a map database. On subsequent range measurements, each related temperature measurement is stored within a map database along with the calculated position from that epoch. Then, by utilizing the historical temperatures which in some embodiments may be filtered (for example, a moving window average, or the most recent measurements), a more accurate model of the point-to-point thermal gradient may be determined and utilized to further temperature to correct the speed of sound estimation for a given positioning epoch.

Such a model allows a more accurate speed of sound calculation which is then used to refine the determined ranges and for thereafter determining the position of the node.

In particular, after the positioning epoch begins (step 402), range measurement signals are transmitted as described above. Thereafter, some or all nodes 102 and/or 104 conduct temperature measurements (step 406). A controlling device such as a server receives the TOF and temperature measurements from the receiver nodes (which may be reference nodes 102 and/or target nodes 104) (step 408). When calculating the position of each node, the controlling device checks if the previous position thereof is known (step 410). If yes, the controlling device then calculates the speed of sound using a stratification method (step 412) and calculates the position of the node using relevant range measurements as described above (step 414). The controlling device then records the temperature measurements and the node positions in a map database (step 420).

If at step 410, the previous position of the node is unknown, the controlling device then calculates the speed of sound using an average of the moving average temperatures on the transmitting and receiving nodes (step 416) and calculates the position of the node using relevant range measurements as described above (step 418). Then, the process 400 goes to step 412 to recalculate the speed of sound using the stratification method, and recalculates the position of the node using relevant range measurements as described above (step 414). The controlling device then records the temperature measurements and the node positions in a map database (step 420).

In some embodiments, precise range information (for example, range information obtained from TOF measurements) may not be available between a sufficient number of nodes to resolve a position. In these embodiments, the device may utilize independently or through data fusion, RSSI measurements from its radio communication to determine a coarse accuracy range. Known methods to relate the RSSI to a numerically range are suitably used, such as the path loss model or known RSSI fingerprinting methods. While the accuracy of an RSSI measurement is known to be much poorer than an acoustic TOF measurement, the accuracy of the system is still significantly improved compared to traditional RSSI-only based systems due to the accuracy to which the reference nodes 102 have been localized in the SLAM procedure utilizing TOF measurements. Further, in some cases both TOF and RSSI measurements may not provide sufficient data to determine the 3D position of a target node 104. In these cases, a lower dimensionality (for example, two-dimensional (2D) or one-dimensional (1D) (i.e. proximity) to the location of the node 104 may be determined.

In some embodiments, the system may further comprise a computing device, a graphics processing unit (GPU), and a monitor, for digitally twinning movements of nodes using a graphics engine and visualization application.

In some embodiments, the system further comprises an analysis engine which is coupled to the database containing historical position data. Analysis on position data is conducted to complete time studies, process optimizations, incident analysis, quality assurance, and the like. Various outputs may be generated by the analysis engine, including playable timeseries 3D visualizations of objects, process alignment and differencing, heatmap graphs, and/or the like.

In some embodiments, a machine-learning algorithm, such as an artificial neural network, convolutional neural network, or the like, may be used for determining events from position data relayed to the server and from other external sources, such as a warehouse management system, enterprise resource planning system, or the like. In further embodiments, such machine-learning algorithm may also autonomously issue actions or commands in response to the determined events, for example, by dispatching a warehouse worker to a location in a warehouse, or by issuing an order for product to a vendor. In some other embodiments depicted in FIGS. 13 and 16A, data is processed in real-time and related to a workflow process to determine if errors are made in said workflow, or to measure certain aspects of the process such as the time to complete each step of the workflow and the like. User-defined events may be determined when measured processes operate outside of defined parameters, which may generate an alert dispatched to a responsible person through a mobile application, desktop application, e-mail, integrated alert system, and/or the like. End-users define specific events and parameters for a given process through a system training mode in which the process is conducted normally and recorded position data is stored in memory as a template. Through the user interface (FIG. 16A), certain specific events in the recorded template may be adjusted to allow to for expected process variances.

Figure 26:
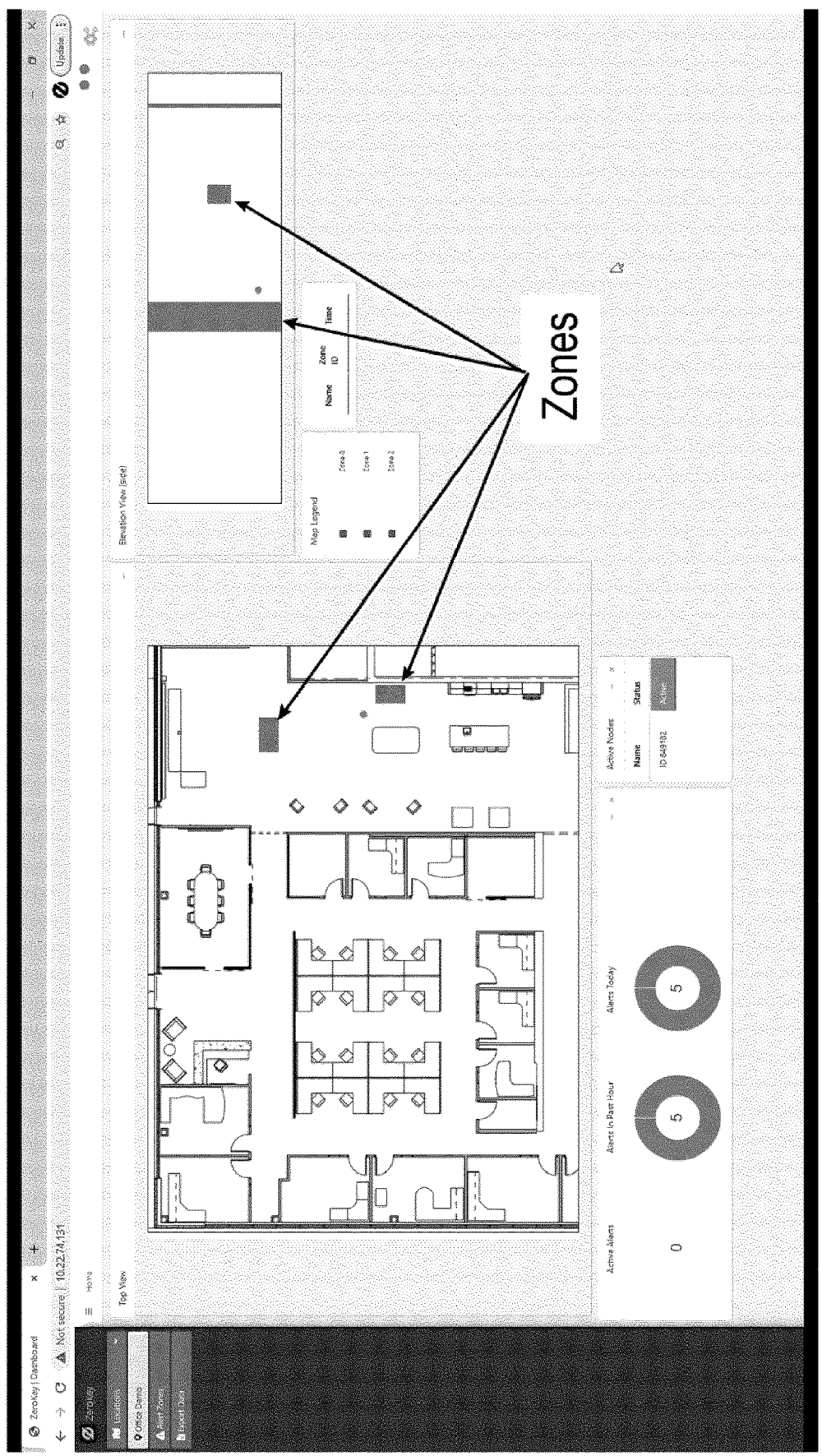
FIG. 26 show a dashboard website.

In some embodiments, the system further comprises wearable target nodes 104 (or simply denoted "wearable nodes") worn by users employed in dangerous environments. The wearable node 104 tracks the position of the wearer. As shown in FIG. 26, zones within the environment may be defined and associated with different classes of spaces, such as exclusion zones, hazardous zones, authorized personnel only zones, security zones, and the like. Each wearable node 104 transmits its determined position to a server. The position of the wearable node 104 may be visualized on a dashboard website (FIG. 26), accessible by managers or other parties as needed. If a wearable node 104 is or becomes located within one of the defined zones, a database query is made to determine if the associated user is permitted entry into the given zone. If no authorization is confirmed, an alert is generated and may be dispatched to the user to alert them to potential danger, and/or to an appropriate custodian. Zones need not be static and may be activated or defined when certain processes are initiated either manually or by another target node 104 entering a given space, for example in one scenario when an overhead crane is in active operation, a target node 104 located on the payload indicates it had been lifted off the ground via its reported position, and resultingly an exclusion zone is automatically activated below the payload with said zone automatically repositioned on the payload as the crane adjusts its position.

In some embodiments, all event and position data are stored within a database, which may be reviewed later to provide an objective recording useful for a variety of tasks such as incident analysis, process optimization, recall analysis, and the like.

In some embodiments, one or more target nodes 104 may further comprise a vibration motor for alerting a user of an event.

In some embodiments, one or more target nodes 104 may further comprise an illuminator light for alerting a user of an event.

In some embodiments, one or more target nodes 104 may further comprise a buzzer for alerting a user of an event.

In some embodiments, a machine-learning algorithm, such as an artificial neural network, may be used for estimating the time of arrival of a signal.

In some embodiments, one or more nodes 102 and/or 104 may further comprise a GNSS receiver. In this embodiment, range measurements to reference nodes 102 and range measurements to GNSS satellites are fused to determine a high accuracy positions.

In some embodiments, one or more nodes 102 and/or 104 may further comprise an ultra-wideband transceiver.

Implementation of Object-Positioning System

Many Indoor Positioning Systems (IPS) are emerging to meet the needs of industries that are looking to track personnel, autonomous vehicles, manual workflows, and assets in order to improve worker safety and process efficiency. The Object-Positioning System disclosed herein, which in some embodiments may be deployed as an IPS, may provide consumer-ready three-dimensional positioning accuracy at millimeter-level across very large environments. This section describes Applicant's IPS with the laboratory testing results to verify performance. The positioning problem is described mathematically, and the traditional solution is presented. Ranging performance of the proprietary implementation is shown to be comparable to that of geodetic-grade optical instruments (for example, total stations) and that stationary multidimensional positioning performance is best-in-class achieving accuracies down to the millimeter. Real-world trials show millimeter-level performance (or sub-centimeter in some cases) across large industrial environments such as warehouses, factories, and logistics hubs. The technology's flexible form-factors allow for daisy chained permanent installations or agile battery powered deployments. Accompanying software provides a flexible user experience that readily interfaces with equipment spanning conventional computing hardware to the latest virtual and augmented reality platforms.

I. INTRODUCTION

GLOBAL Navigation Satellite Systems (GNSS) and Indoor Positioning Systems are two of the key technologies sharing center stage in today's navigation and positioning revolution. While GNSS is a robust 3-dimensional, geolocation technology providing civilian-use positioning accuracy on the order of 4 meters (m) RMS (root mean square), the dependence on line-of-sight signals from satellites limits reliable use to outdoor and clear sky environments [1]. As such, there is a growing landscape of solutions to deliver reliable positioning in indoor environments and outdoor solutions in GNSS-denied areas. Just as a multitude of new goods and services were made possible due to an accurate outdoor positioning system (for example, GPS), similar economic opportunities await solutions to the exponentially growing indoor positioning market. Estimates predict the market opportunity to be on the order of $10 billion per year by 2024 [2].

There is a heterogeneous collection of technologies delivering IPS, spanning radio frequency equipment such as cellular 5G networks, Wi-Fi networks, ultra-wideband (UWB) transceivers, and Bluetooth Low Energy (BLE) devices, to optical solutions using cameras or lasers, to acoustic waves used in ultrasonics.

Most non-camera based IPS solutions operate generally by determining the distance of a tracked object to a known reference device. This is accomplished by relating received signal power or time-of-flight to a distance. In the case of BLE and Wi-Fi solutions, localization of objects relies upon the RSSI, and offers positioning accuracy on the order of meters (for example, 70 cm to 20 m) [3][4]. Ultra-wideband systems have better accuracy by measuring the TOF of an Electro-Magnetic (EM) wave from an object to several receivers (anchor nodes), achieving measurements accurate to tens of centimeters [5]. Camera-based computer vision provides accuracies ranging from 15 cm to 1 m [6], depending on the environment and lighting conditions. Ultrasonics, similar to UWB, uses TOF information but due to the relatively slow speed of sound when compared to EM waves, enable localization below 2 cm [7][8].

TOF based positioning is similar to TOF imaging, such as medical sonography, where energy in the form of waves is transmitted into an area to be recovered by an array of receivers. The time-of-flight is measured and converted to a distance in order to calculate a position. In the case of imaging, the distance may represent the distance to a reflector that redirected the wave to receivers that are typically located near the transmitter as complimentary components of the same imaging device.

In the context of a positioning system there is a space separation between the transmitter and each receiving device such that the computed range represent the separation distance between the devices. With an array of receivers producing an array of ranges, the transmitter's location may be determined using a multilateration method, assuming the locations of the receivers are known.

The separation between the transmitter and receiver complicates the range calculation as the receiver and transmitters do not share a common clock, which is a requirement to measure the time-of-flight of a signal. TOF imaging generally does not have this issue because the transmitter and receivers are co-located, the clock is shared within the same device.

To overcome the challenges imposed by unknown time information, one of two solutions are typically employed. One solution requires the receivers (or transmitters) to have synchronized clocks such that the time-difference-of-arrival (TDOA) may be used to recover the clock information [9]. A second solution employs two-way ranging where a round trip signaling exchange is used to transmit TOF information to the originating device, which maintains a single clock shared across its transmitting and receiving components [9]. Unfortunately, in either case, errors in timing from clock drift or system latency are significant and are multiplied by the wave propagation speed. In the case of EM waves, even a small timing error results in very large range errors due to the extremely fast propagation speed thereof, that is, the speed of light ($2.99 \times 10^8$ m/s). In GNSS this problem is addressed through the use of highly accurate and synchronized atomic clocks, which are a key component of every GNSS satellite. Such an approach is feasible for systems having a limited number of satellites. However, for indoor systems having a large number reference devices such as thousands of reference devices, it is clearly infeasible to include an atomic clock in every device.

II. HYBRID IMPLEMENTATION FOR ACCURATE IPS

An accurate range measurement between the target node or device 104 (also called the mobile node or device hereinafter) and the reference node or device 102 (also called the anchor node or device hereinafter) is the limiting factor for accurate 3D positioning. Applicant's solution merges the most reliable and accurate ranging techniques. The large propagation speed differential between ultrasonic and EM waves permits the use of the EM wave as a time reference while using the slower ultrasonic wave for the distance measurement[14]. The main advantage ultrasonic waves offer over their EM counterparts is the increased time allotted for signal samples to be collected between the transmission and reception of the acoustic wave. Range error is inversely proportional to wave propagation speed and for a point-to-point transmission is determined by:

$$\delta r = dT \times c \quad (1)$$

where $\delta r$ is the range error in meters, c is the wave propagation speed in m/s, and dT is the timing error in seconds. For precise positioning, the smallest achievable $\delta r$ is desired. It is apparent that if timing error is determined by the quality and cost of the hardware, it may then be considered to be consistent across devices within the same product class. Thus, to achieve the smallest $\delta r$ the much lower propagation speed of acoustic waves (~343 m/s) is desirable over that of EM waves ($2.99 \times 10^8$ m/s).

A second advantage of using acoustic signals for ranging is the improved multipath characteristics, that is, the manner in which the wavelength of the wave dictates how the energy is absorbed, reflected, and diffracted by objects in the environment. For example, the reflections off a nearby moving forklift or a storage rack are specular for high frequency EM waves yet diffuse for ultrasonic waves. Specular reflections are a problem since they arrive as overlapping time-shifted copies of the transmitted signal, thereby corrupting the original signal and the calculated range [11]. In the case of diffuse reflections, the transmitted energy is scattered in multiple directions, ultimately presenting as a lower level of multipath noise at the receivers.

II.A. Implementation Overview

When two signals with different propagation speeds are sent from a mobile device 104 to a fixed anchor 102, the distance therebetween may be determined by:

$$r = \frac{c_{rf} c_a \Delta t}{c_{rf} - c_a} \quad (2)$$

where r is the distance between the mobile device 104 and the anchor device 102, $c_{rf}$ is the propagation speed of the faster $c_a$, is the propagation speed of the slower second-speed signal, $\Delta t$ is the difference between the arrival times of the two signals [14]. Once a range is determined between the mobile device 104 and the anchor device 102, the determined range may be related to or otherwise used for determining a position of the mobile device 104, depending on the desired dimensionality of the position and the number of available ranges. With an increasing number of ranges available, it becomes possible to localize the mobile device 104 to an increasingly specific position as depicted in FIGS. 7A to 7C.

Figure 7A:
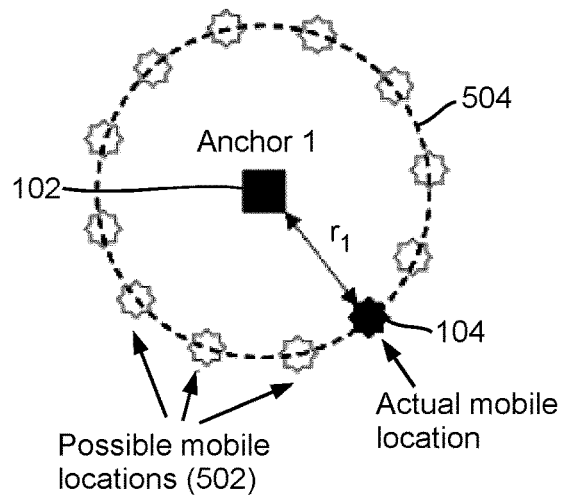
FIGS. 7A to 7C are schematic diagrams showing a multilateration method for determining the location of a mobile object.

FIG. 7A shows that, when an anchor node 102 is used for determining the position of a mobile node 104, any position 502 on the circle 504 centered at the anchor node 102 with a radius $r_1$ (which is the distance between the anchor and mobile nodes 102 and 104) may be a possible position of the mobile node 104.

Figure 7B:
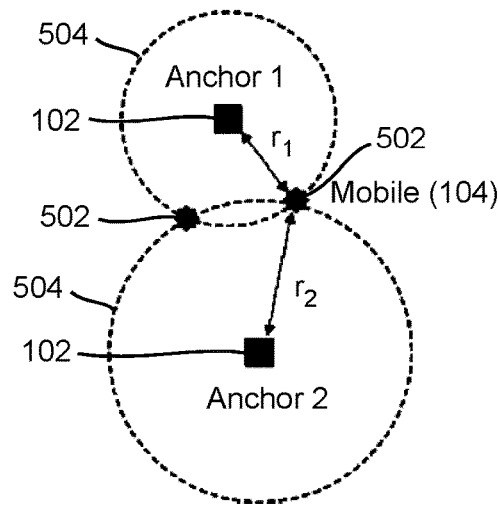

FIG. 7B shows that, when two anchor nodes 102 are used for determining the position of a mobile node 104, the two intersection points 502 of the two circles 504 each centered at a respective anchor node 102 with a radius of the distance between the respective anchor node 102 and the mobile node 104 may be the possible positions of the mobile node 104.

Figure 7C:
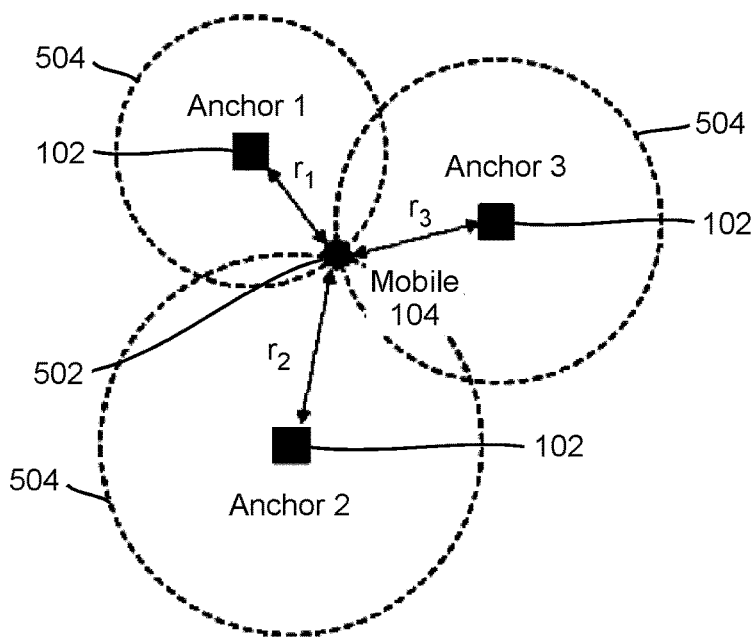

FIG. 7C shows that, when three anchor nodes 102 are used for determining the position of a mobile node 104 on the same plane thereof, the intersection point 502 of the three circles 504 each centered at a respective anchor node 102 with a radius of the distance between the respective anchor node 102 and the mobile node 104 may be the position of the mobile node 104.

Conveniently, the mobile device 104 only needs to send out one EM and acoustic signal pair for all anchor devices 102 to detect, that is, each anchor device 102 does not need to be individually addressed, and therefore the multiple correlated ranges may be calculated simultaneously.

Figures 8A, 8B:
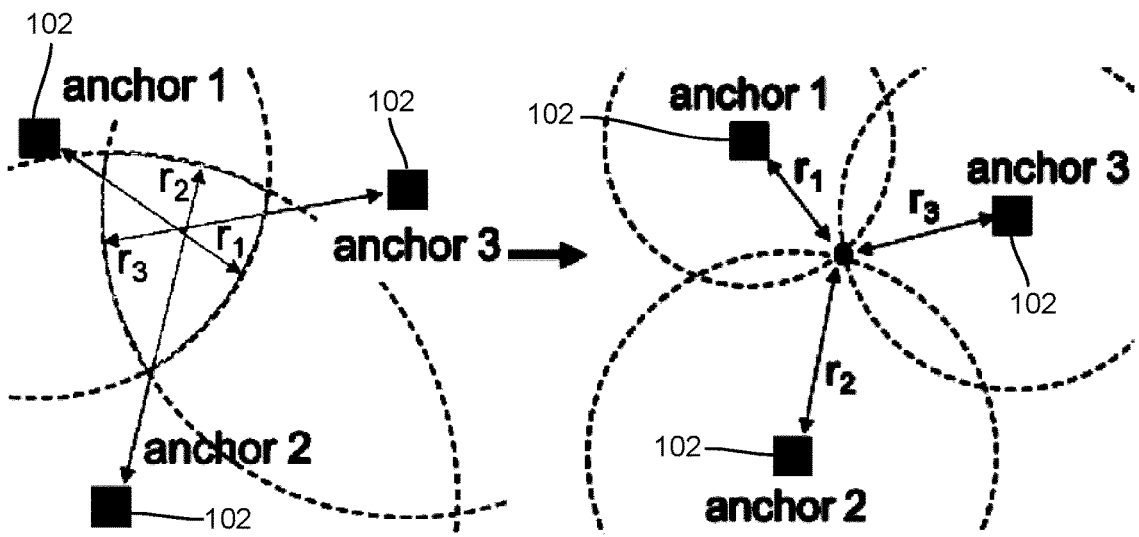

Due to environmental noise and other noise sources, there may be accuracy impairments in the calculated ranges which adversely affects the calculated position. Methods used in modern GNSS techniques for estimating estimate the mobile position (such as Kalman filter, Bayesian estimator, least squares method, and the like) may also be used in the object-positioning system 100 disclosed herein to derive the best estimate of the positions of mobile devices 104. FIG. 8A illustrates the solution ambiguity arising from range measurements corrupted with error, as opposed to the case where the calculated ranges are exact as shown in FIG. 8B.

II.B. Error Minimization

In order to derive the best estimate of the position of a mobile device 104 from a collection of imperfect ranges, an expression for the position error is investigated:

$$e = \sum_i^N (r_{m_i} - r_i)^2 \quad (3)$$

where e is the sum of the squares of the individual range errors, $r_{m_i}$ is actual range between the mobile device 104 and the i-th anchor device, and $r_i$ is the calculated range based on the transmitted and received signals. One approach of minimizing the error takes the derivative of Equation (3) and sets it to zero. This requires the expanded versions of the components that make up e:

$$r_n = \sqrt{(x_m - x_n)^2 + (y_m - y_n)^2 + (z_m - z_n)^2} \quad (4)$$

$$e_i = (r_{actual} - \sqrt{(x_m - x_n)^2 + (y_m - y_n)^2 + (z_m - z_n)^2})^2 \quad (5)$$

where $x_m$, $y_m$, $z_m$ represent the unknown coordinates for the mobile device 104, $x_n$, $y_n$, $z_n$ represent the known coordinates for the n-th anchor device 102, $r_n$ is the calculated range to the n-th anchor device 102 based on the TOF measurement. Therefore, a solution for an over determined linear system of equations exists in the form:

$$R = Am \quad (6)$$

$$m = \begin{bmatrix} x_m \\ y_m \\ z_m \\ \sqrt{x_m^2 + y_m^2 + z_m^2} \end{bmatrix}, \quad (7)$$

$$A = \begin{bmatrix} -2x_1 & -2y_1 & -2z_1 & 1 \\ -2x_2 & -2y_2 & -2z_2 & 1 \\ \vdots & \vdots & \vdots & \vdots \\ -2x_n & -2y_n & -2z_n & 1 \end{bmatrix}, \quad (8)$$

and $$R = \begin{bmatrix} r_1 - x_1^2 - y_1^2 - z_1^2 \\ \vdots \\ r_N - x_N^2 - y_N^2 - z_N^2 \end{bmatrix}, \quad (9)$$

where in this case:

Since m contains the unknowns Equation (6), the equation is rewritten to isolate them:

$$m = A^{-1} R. \quad (10)$$

In most cases A is not square and therefore not invertible. The matrix A is multiplied by its transpose to obtain an invertible square matrix. After applying the transpose to both sides of the equation:

$$A^T R? = A^T Am, \quad (11)$$

and $$m = (A^T A)^{-1} A^T R. \quad (12)$$

The $A^T A$ term is invertible [9]; thus m may be solved. The solution is the least squares solution as the resulting position is the one that minimized the square of the differences between the actual and measured ranges.

II.C. Timing Correction

Minimizing the error in the ranges also requires proper detection of the moment of arrival of the incoming signals. The receiver often takes the form of an energy detector [12] that detects energy levels above a certain threshold.

To determine the range precisely, various methods may be used to provide improved performance as shown in the following section.

III. IMPLEMENTATION PERFORMANCE

The solution disclosed herein comprises one or more mobile devices 104, a plurality of anchor devices 102 and one or more USB or Ethernet connected gateway modules 204. Two performance metrics, including ranging accuracy and 3D positioning accuracy, are the focus of system verification.

Figure 9:
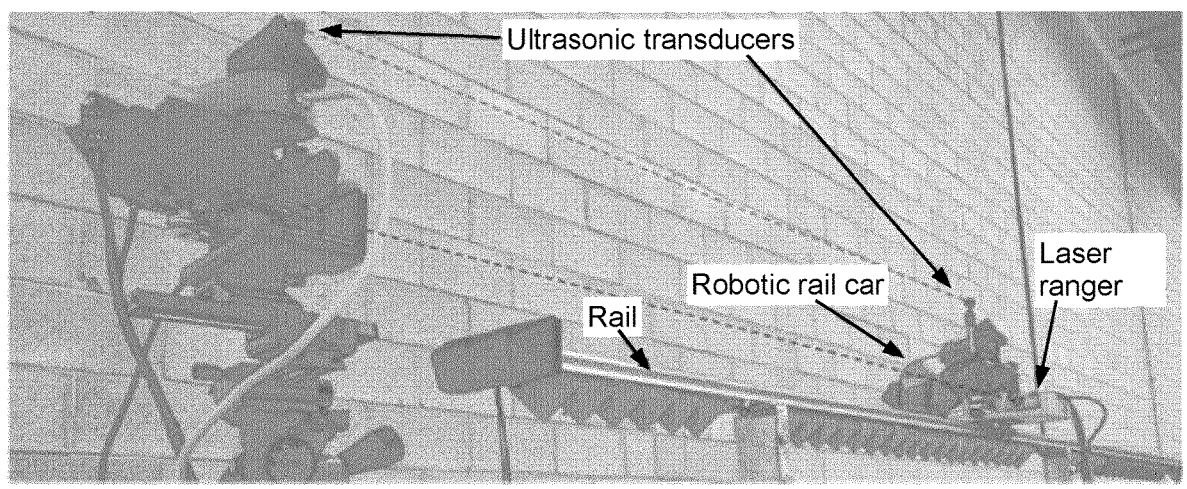
FIG. 9 illustrates the design's ranging performance characterized against a laser ranger with 2 mm accuracy at multiple distances along a rail.
Figure 10A:
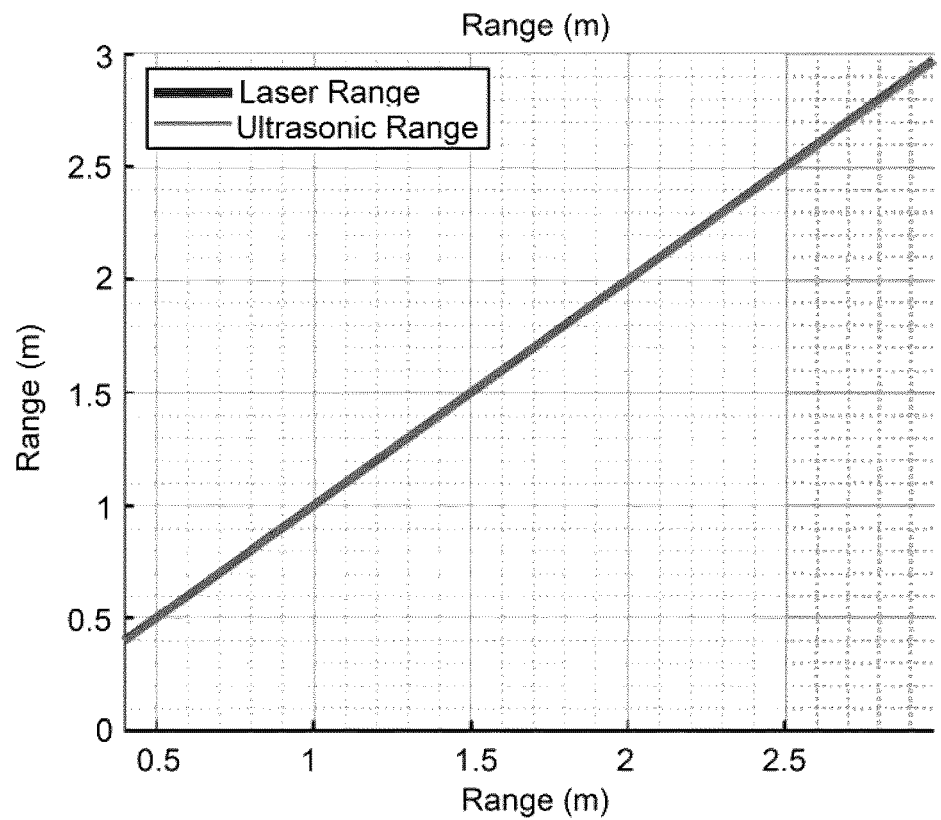
FIGS. 10A and 10B show ultrasonic and laser range measurement comparisons wherein on average the measurements differ by 2 millimeters (mm) which is within the accuracy of the laser ranger.
Figure 10B:
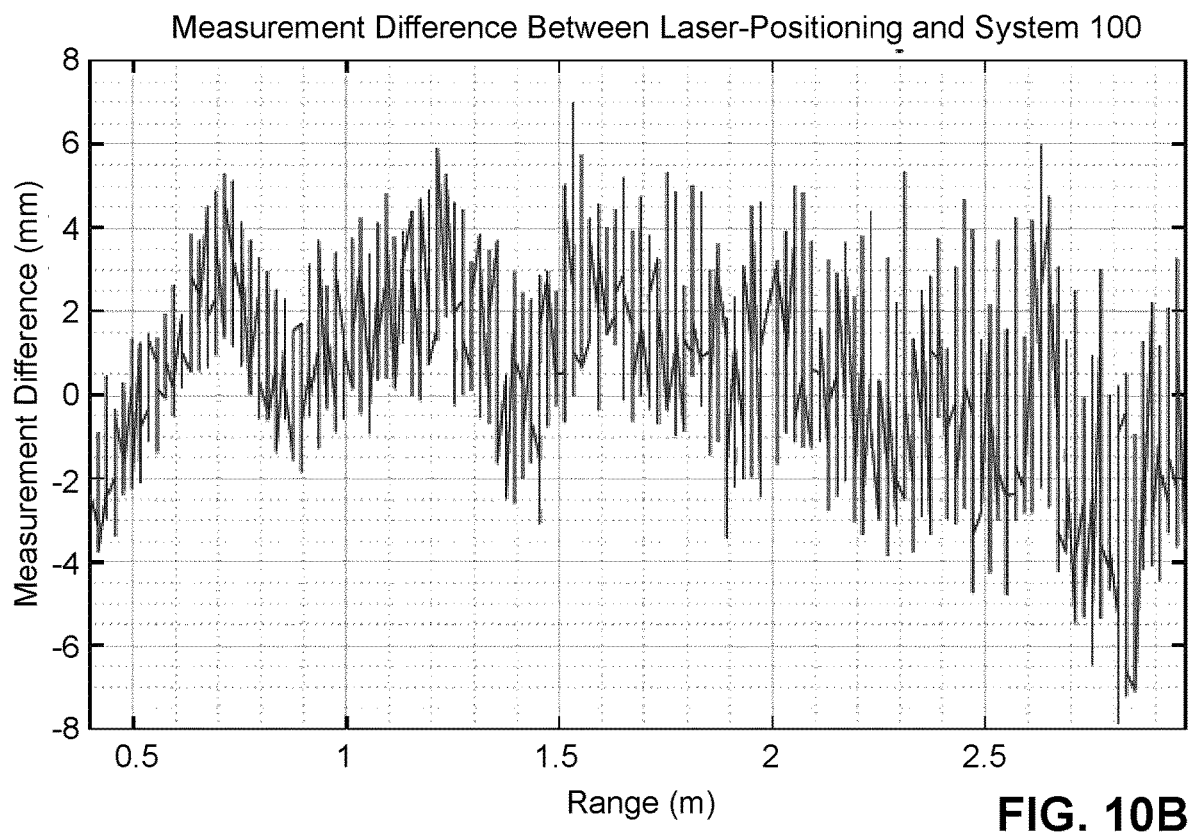

For range verification, the system 100 aims to be as accurate as conventional laser rangefinders that have accuracies within +/−2 mm. To test the performance, a mobile device 104 is attached to a robotic rail car which carries the mobile device 104 and a laser rangefinder along a rail while measuring the distance between the car and a fixed anchor device 102. The setup is depicted in FIG. 9. At each desired distance, the range is measured by the laser and by the ultrasonic mobile-anchor pair whilst noise is injected to mimic real-world conditions. FIGS. 10A and 10B show the results for a typical experimental run for ranges between 0.4 m and 3 m. Typical results are within the ranging accuracy of the laser ranger when there is a clear line of sight path between the mobile device 104 and the anchor device 102.

Figure 11A:
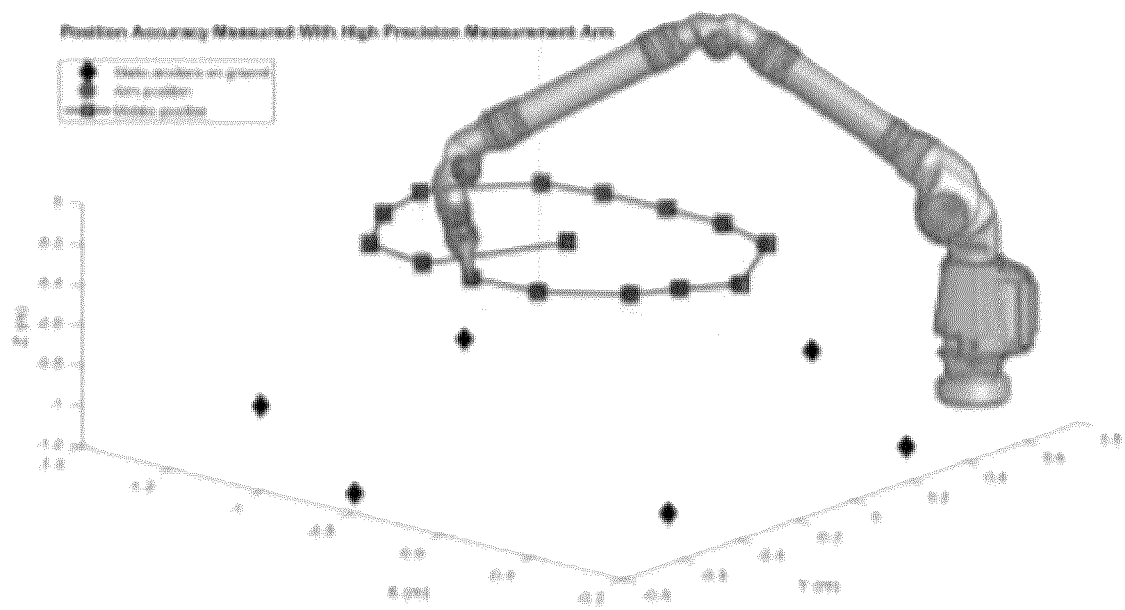
FIGS. 11A and 11B show reported three-dimensional (3D) positions for the measurement arm and the ultrasonic system (FIG. 11A), and ultrasonic position error for each 3D axis (FIG. 11B).
Figure 11B:
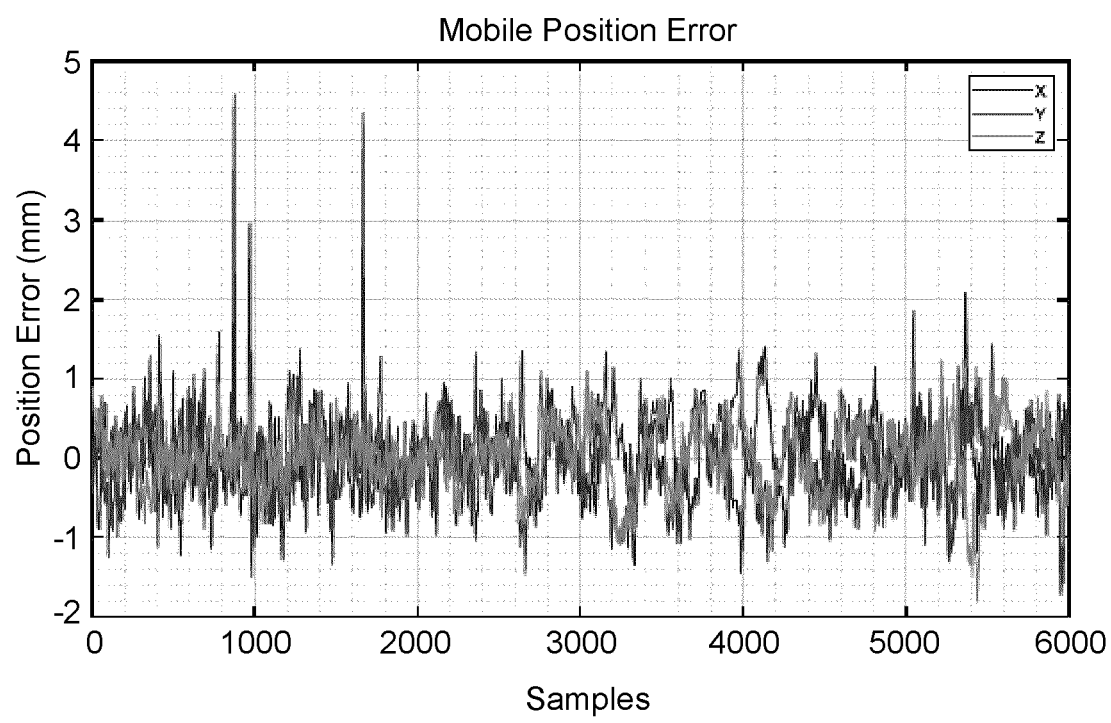

Verification of 3D positioning accuracy requires a system with a mobile device 104, a gateway device 204, and multiple anchor devices 102. A Faro Platinum Arm offered by FARO Technologies of Lake Mary, FL, U.S.A. is used as a ground truth system to hold and accurately report the position of the mobile to within 0.073 mm. Six (6) anchor devices 102 are placed in fixed locations on the ground. The arm's probe, containing the mobile device 104 is relocated multiple times in 3D space and the reported positions from the measurement arm and the system 100 are recorded and compared. FIGS. 11A and 11B show the 3D positioning results as well as the errors for each Cartesian axis over the duration of the test. Despite individual ranging accuracy being on the order of 2 mm, after Kalman filter fusion of six (6) ranges from all six anchor devices, the final estimated position error is on average better than +/−1 mm.

IV. DEPLOYMENT EXAMPLES

Many applications may require accurate positioning and localization of employees, automated/autonomously guided vehicles, tools, and other movable assets. While conventional solutions are difficult to (and sometimes may fail to) meet accuracy specifications, often large in form-factor, and require complex installation procedures, the system 100 disclosed herein provides improved performance, ease-of-use, flexibility, size, and portability. The technologies disclosed in references [14][15][16] may be used in system 100 (for example, in the anchor devices 102 and/or mobile devices 104) in multiple form factors as shown in FIGS. 12A to 12D to suit the needs of a wide variety of deployment scenarios; from coin-cell powered mobiles and nodes to power-over-Ethernet (POE) driven anchors.

Current deployments demonstrate the flexibility of the system 100 from small-scale workbench applications to large building scale factories and warehouses. FIG. 13 shows an example of the system working on a small scale, with mobile devices 104 worn on an operator's wrists and used for tracking the operator's hand movements for employee training and workflow optimization applications. In this example, the mobile devices 104 are powered by batteries whereas the anchor devices 102 are powered by USB connections.

Figure 14:
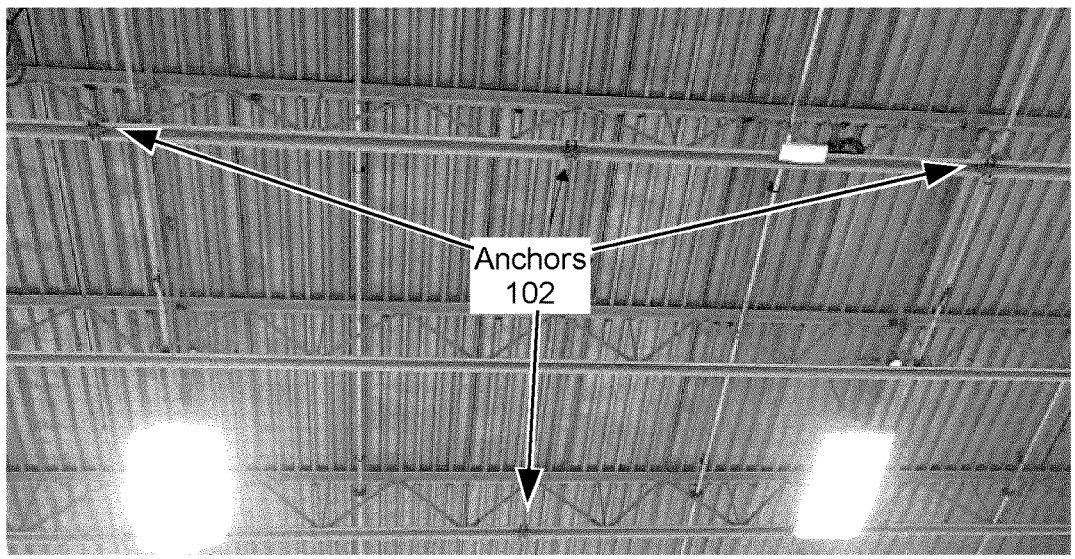
FIG. 14 shows a ceiling deployment 7.2 meters (m) above ground using POE daisy-chained anchors.
Figure 15:
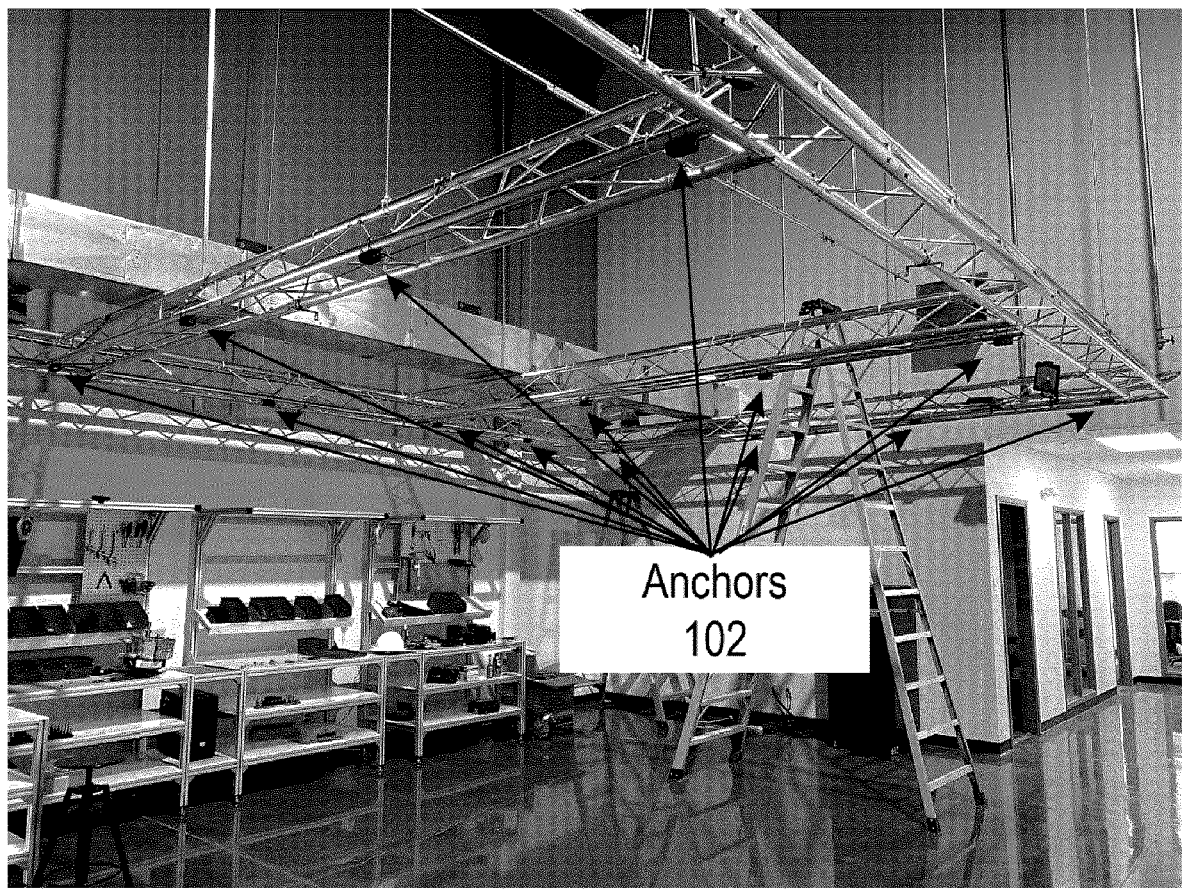
FIG. 15 shows a wall deployment daisy chaining from the ceiling.

Large-scale deployments include factories and warehouses such as those shown in FIGS. 14 and 15 where the anchor devices 102 are deployed at heights in excess of 7 m above the floor. In scenarios such as these, a plurality of anchor devices 102 of various forms are linked together in a daisy-chain form and are powered using Power-over-Ethernet (POE), thereby providing convenient and low-cost installation. Another advantage of the system 100 disclosed herein is that, despite the large scale of these types of installations, accuracy is still on the order of millimeters. This enhanced monitoring of factory spaces offers to reduce potential downtime and improve process efficiencies. The deployments and uses of the system 100 span several industries, including supply chain management and logistics, advanced manufacturing, and health and safety, which demonstrate the viability of the technology disclosed herein, taking localized workflow monitoring to scales that include the entire line of a factory process.

Figure 16A:
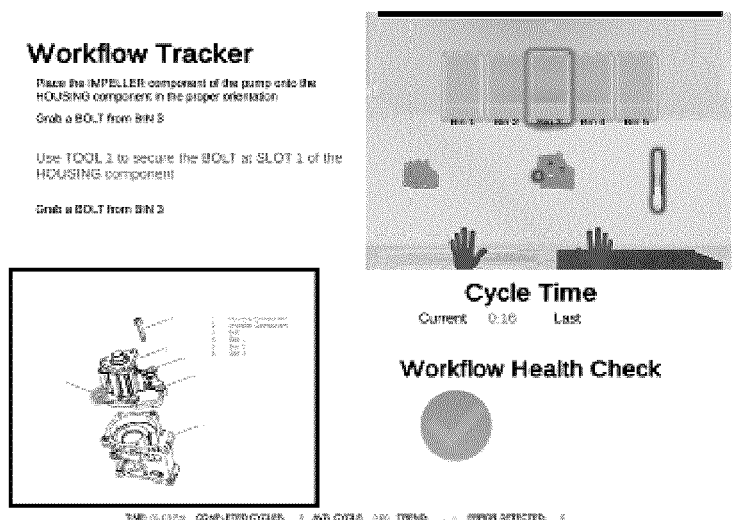
FIGS. 16A and 16B show examples of user interface monitoring and control.
Figure 16B:
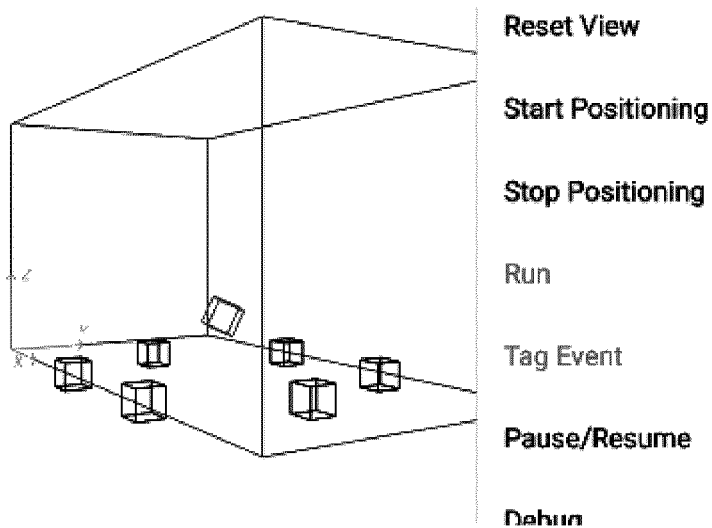

The system 100 may also comprise application software developed for a variety of platforms such as desktop PC's and Android devices, for control and visualization by end user. FIGS. 16A and 16B show some examples of the interfaces thereof. As shown in FIG. 16A, a real-time quality assurance digital twinning use-case is displayed where technicians are guided through the assembly process of a part while having their hands, tools, and supplies monitored, verifying the correct procedure is followed precisely. As shown in FIG. 16B, a generic visualization of IPS data is shown on the Android platform.

Figure 17:
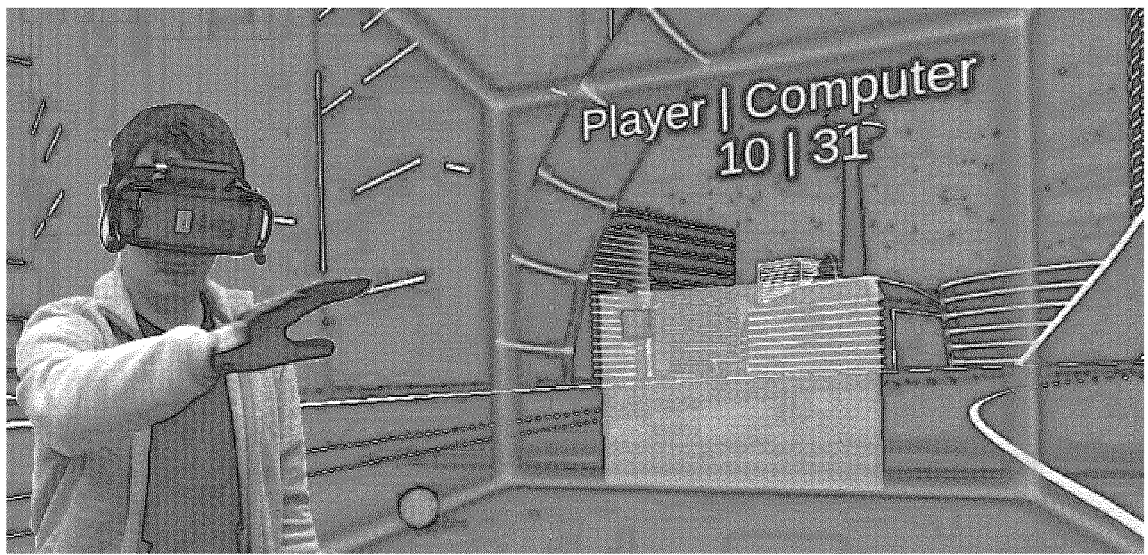
FIG. 17 shows testing of Applicant's positioning integration with industry standard Virtual Reality (VR) platforms.

The system 100, including its hardware and software, is agile and may be interfaced with standard third-party platforms including various virtual reality (VR) platforms such as SteamVR®, Unity, Samsung SXR, Google Glass, and Microsoft Hololens for an immersive interactive experience as depicted in FIG. 17.

V. SUMMARY

The above-described implementation is based on a robust analytical description of the positioning problem, followed by a rigorous mathematical and innovative solution that has undergone stringent testing to produce results besting industry incumbents in its class.

VI. REFERENCES

[1] Global Positioning System Standard Positioning Service Performance Standard, 4th Edition, September 2008. Accessed on: Mar. 8, 2020. [Online] Available: https://www.gps.gov/technical/ps/2008-SPS-performance-standard.pdf

[2] Dardari, Davide, Pau Closas, and Petar M. Djurić. "Indoor tracking: Theory, methods, and technologies." *IEEE Transactions on Vehicular Technology* 64, no. 4 (2015): 1263-1278.

[3] Rai, Anshul, Krishna Kant Chintalapudi, Venkata N. Padmanabhan, and Rijurekha Sen. "Zee: Zero-effort crowdsourcing for indoor localization." In *Proceedings of the 18th annual international conference on Mobile computing and networking*, pp. 293-304. 2012.

[4] Röbesaat, Jenny, Peilin Zhang, Mohamed Abdelaal, and Oliver Theel. "An improved BLE indoor localization with Kalman-based fusion: An experimental study." *Sensors* 17, no. 5 (2017): 951.

[5] Kuhn, Michael, Cemin Zhang, Brandon Merkl, Depeng Yang, Yazhou Wang, Mohamed Mahfouz, and Aly Fathy. "High accuracy UWB localization in dense indoor environments." In 2008 *IEEE International Conference on Ultra-Wideband*, vol. 2, pp. 129-132. IEEE, 2008.

[6] Mulloni, Alessandro, Daniel Wagner, Istvan Barakonyi, and Dieter Schmalstieg. "Indoor positioning and navigation with camera phones." *IEEE Pervasive Computing* 8, no. 2 (2009): 22-31.

[7] Qi, Jun, and Guo-Ping Liu. "A robust high-accuracy ultrasound indoor positioning system based on a wireless sensor network." *Sensors* 17, no. 11 (2017): 2554.

[8] Medina, Carlos, José Carlos Segura, and Angel De la Torre. "Ultrasound indoor positioning system based on a low-power wireless sensor network providing sub-centimeter accuracy." *Sensors* 13, no. 3 (2013): 3501-3526.

[9] Silva, Bruno, Zhibo Pang, Johan Åkerberg, Jonas Neander, and Gerhard Hancke. "Experimental study of UWB-based high precision localization for industrial applications." In 2014 *IEEE International Conference on Ultra-WideBand (ICUWB)*, pp. 280-285. IEEE, 2014.

[10] Williams, Gareth. "Overdetermined systems of linear equations." *The American Mathematical Monthly* 97, no. 6 (1990): 511-513.

[11] Leitinger, Erik, Paul Meissner, Christoph Rüdisser, Gregor Dumphart, and Klaus Witrisal. "Evaluation of position-related information in multipath components for indoor positioning." *IEEE Journal on Selected Areas in communications* 33, no. 11 (2015): 2313-2328.

[12] Kay, Steven M. *Fundamentals of statistical signal processing*. Prentice Hall PTR, 1993.

[13] Gueuning, Francis, Mihai Varlan, Christian Eugene, and Pascal Dupuis. "Accurate distance measurement by an autonomous ultrasonic system combining time-of-flight and phase-shift methods." In *Quality Measurement: The Indispensable Bridge between Theory and Reality (No Measurements? No Science! Joint Conference-1996: IEEE Instrumentation and Measurement Technology Conference and IMEKO Tec*, vol. 1, pp. 399-404. IEEE, 1996.

[14] Lowe, Matthew William, and Vahid Dehghanian. "Range-finding and object-positioning systems and methods using same." U.S. Pat. No. 10,051,599, issued Aug. 14, 2018.

[15] Dehghanian, Vahid, and Matthew Lowe. "Method of determining position and cooperative positioning system using same." U.S. Pat. No. 9,977,113, issued May 22, 2018.

[16] Lowe, Matthew William, and Vahid Dehghanian. "Method for determining the position of an object and system employing same." U.S. patent application Ser. No. 15/982,750, filed Nov. 22, 2018.

Large-Scale Architecture of Applicant's Smart Space Indoor Positioning Network System

I. Introduction

This section describes two architectures of the system 100 in some embodiments, wherein the system 100 is implemented as a large-scale Indoor Positioning System (IPS) deployment in the form of a positioning network system and requiring positioning performance and communications that maintain minimum performance specifications despite increasing system scale.

In this section, a set of architecture principles are described for solving technical challenges with scaling the IPS 100 to large-area deployments and achieving a robust and cohesive architecture that may be commercially useful for various fields such as health, safety & environment (HSE) applications.

II. System Overview

Figure 18:
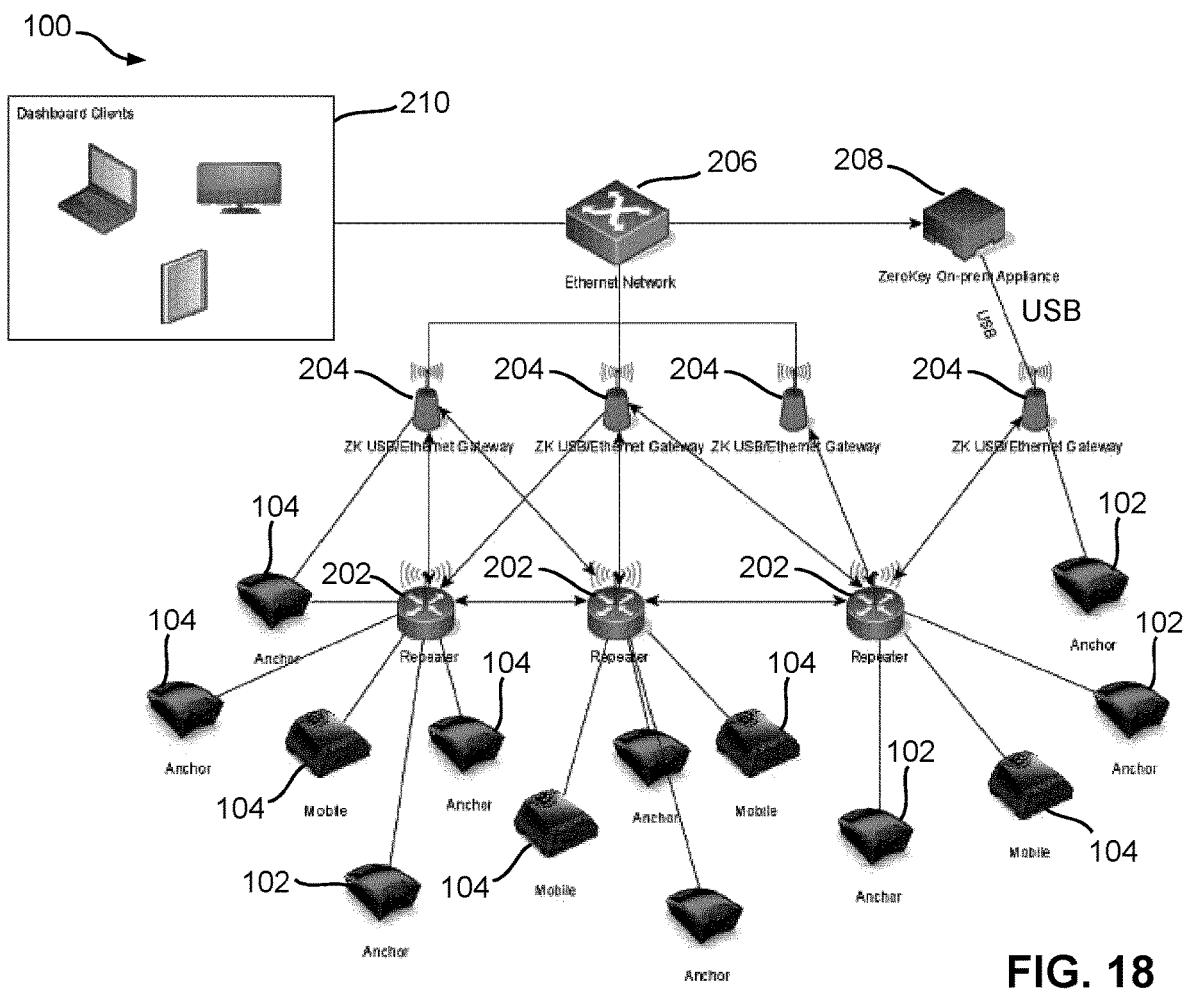
FIG. 18 is a schematic diagram showing a large-scale indoor positioning network system.
Figure 19:
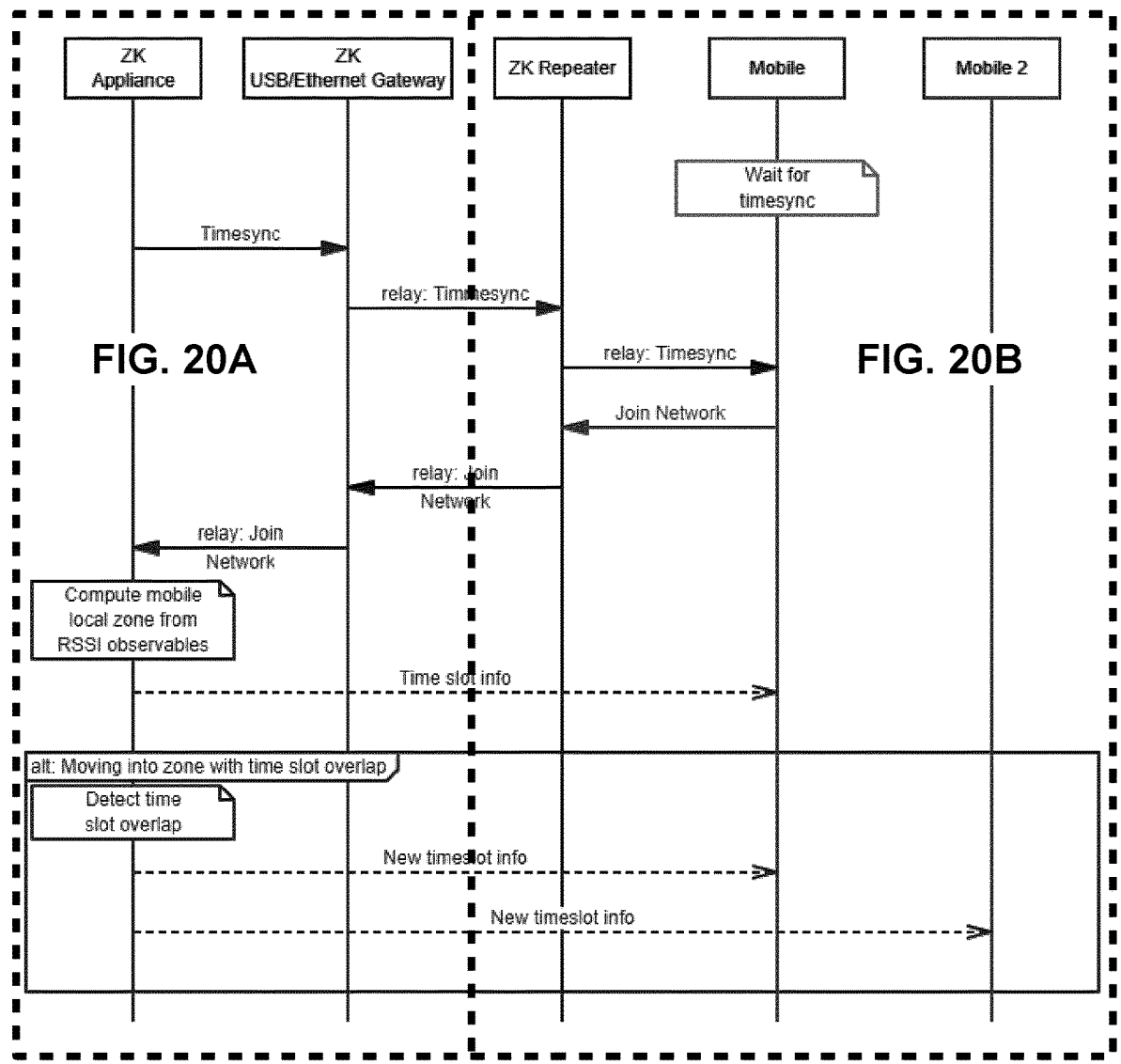
FIGS. 19, 20A, and 20B are a sequence diagram of network join operation.
Figure 20A:
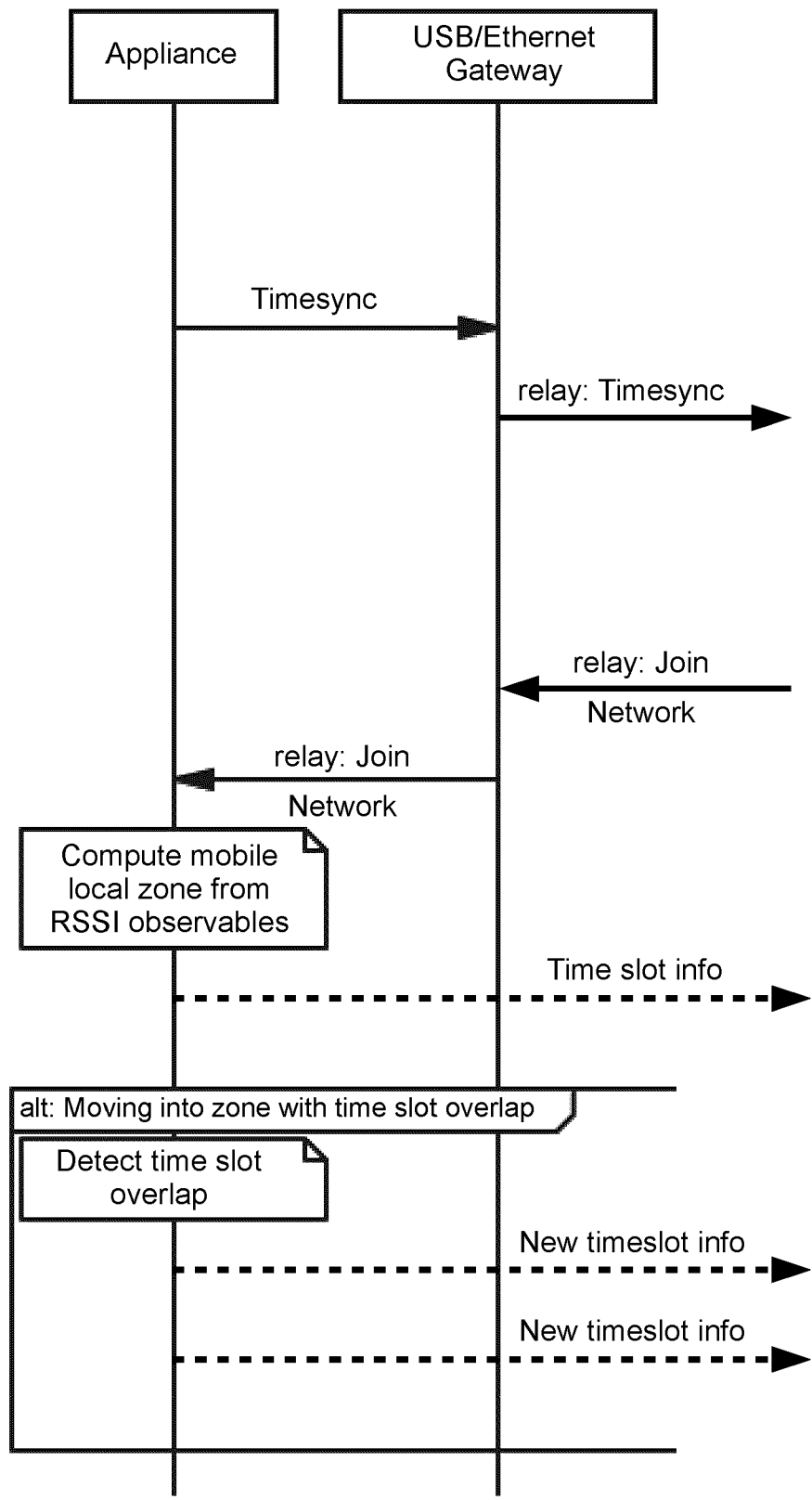
Figure 20B:
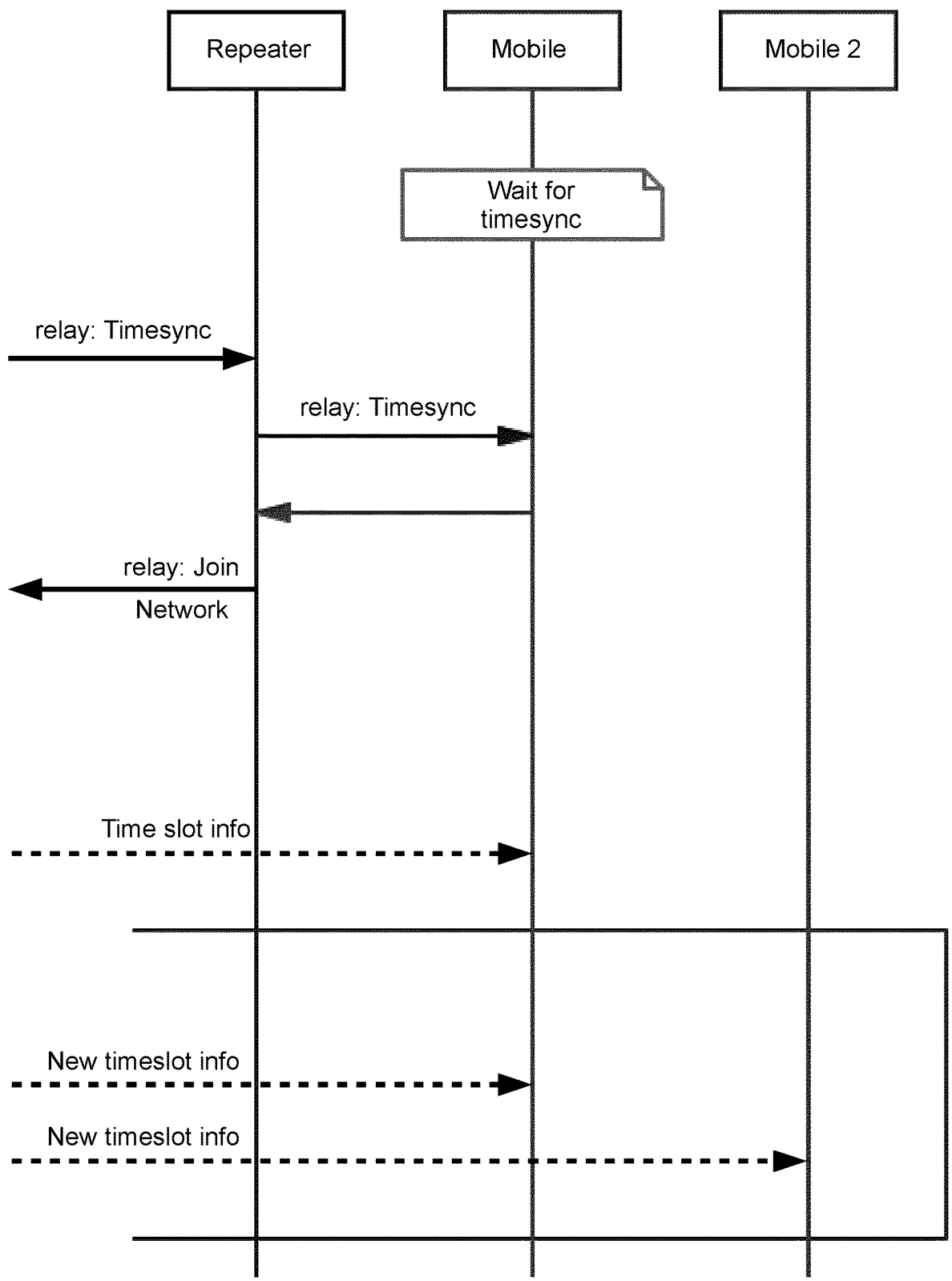

FIG. 18 show the architecture for Applicant's large-scale IPS which is similar to the system 100 shown in FIG. 4. FIGS. 19, 20A, and 20B show a sequence diagram of network join operation. This architecture utilizes several distinct components: anchors nodes, mobile nodes, a gateway, and in some variants, repeater nodes. This aspect of the description is focused on the normal operation of the system only, and other stages such as installation or calibration are omitted.

The fundamental principle of this architecture is that mobile nodes subscribe to locally located anchor nodes to utilize a slice of their acoustic channel for range measurements. This subscription is managed either in a centralized fashion (variant A) with a service application, or in a decentralized (variant B) fashion with subscriptions being brokered directly by individual anchor nodes. As mobile nodes traverse the tracking area, the local zone may encompass new nodes which may be automatically subscribed to, and similarly, the local zone may no longer encompass previously subscribed nodes which may be automatically unsubscribed therefrom.

III. Basic System Architecture (Variant A2)

In a small-scale system, a gateway device (also called a "controller") may be used for managing all nodes attached to the network. However, scale issues arise due to limitations in RF range from this singular controller. Extension of range is possible through the addition of additional gateways, but invariably gives rise to synchronization issues between the gateways. To address this issue, this variant of the architecture contains the control functions of the system within the server application. Numerous gateways may be configured to connect to the application through IP connection and/or USB connection. This ensures all state information of the system is centralized and correct decisions may be made to provision channel resources to the mobile nodes.

A key enabler of this architecture is the availability of data communication across the entirety of the network through repeater devices. These devices are deployed through the environment to act as relays between the gateways and network nodes. Ideally, the position of most relays and nodes is known and therefore optimal point-to-point routing may be used for most data communication.

As a method to boost channel bandwidth, especially in anticipation of multiple relay hops, each repeater and gateway may contain two radios operating on different channels. One channel may be used for the normal communication between anchors and mobiles, and the other channel may be reserved for data relay between repeaters and to gateways.

With the architecture, the system may operate in a nearly identical way to the small-scale system while having some key improvements such as:

Timeslots may be defined into frames as described below in the radio protocol section.

Ultrasonic timing may not be dependent on radio timeslots.

Last mobile node position may be transmitted with position requests.

RSSI values may be included in all packets for low-accuracy localization required to determine nearest hop and avoid overuse of general-purpose timeslots.

Fast channel switching may be utilized.

The server application may provision timeslots in a uniform manner across the system, and then as unique slots are no longer available, provision overlapping slots to spatially separated nodes.

The server application may monitor the position of all nodes and re-provision specific timeslots if nodes converge within a predetermined range.

Adjusting mobile node update rates may be dynamically changed by assigning or revoking additional timeslots.

The positioning engine may only run in the mobile node when necessary. In cases where the mobile needs to know its position, it may listen on the pipe(s) belonging to the target repeaters to catch the range result measurements being forwarded to the repeaters/gateways from the anchors.

IV. Ultrasonic Timeslots

Figure 21:
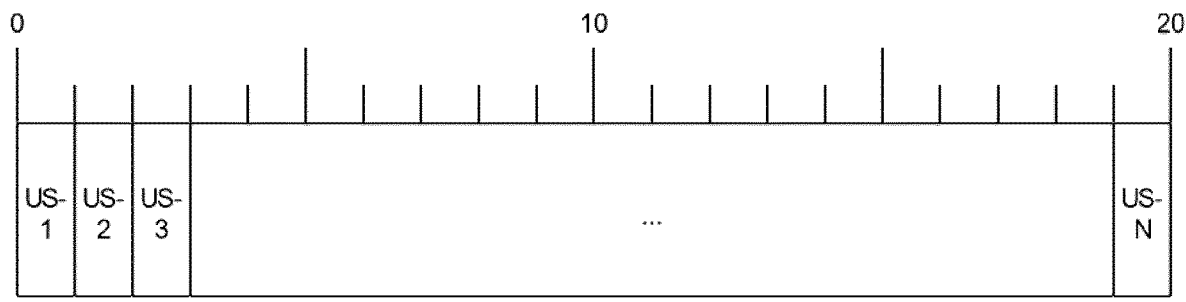
FIG. 21 is a diagram indicating ultrasonic timeslots.

Ultrasonic timeslots have no complicated frame structure. As shown in FIG. 21, the acoustic channel is simply divided into N slots where N is the maximum number of nodes supported in a local zone times the minimum update rate in Hertz.

V. Main Network Radio Protocol

The radio protocol is designed around a TDMA methodology and guided by the following considerations:

Timeslots indicate the time in which a given device may transmit.

Each timeslot must be long enough to accommodate the largest possible over-the-air packet and a padding buffer on both sides of the slot equal to half of the maximum expected clock drift.

The radio channel is divided into timeslots, which are grouped into frames, which are grouped into superframes. This allows tuning of ratios of timeslot types while maintaining consistent timeslot widths.

The superframe must have one frame for each mobile in a zone when at maximum density.

Each frame may have timeslots for anchors allocated at least at a minimum of the expected density of anchors: 1.

Each repeater and gateway device must have one timeslot per superframe.

Each superframe may have one general-purpose timeslot for devices which do not have an assigned timeslot.

Superframes may be kept as small as possible to ensure frames lapse faster than ultrasonic timeslots.

The response frame used by anchors during reporting of a range measurement may be a fixed number of frames in the future.

Any use of a shared timeslot, such as the general-purpose timeslot may be accompanied by some randomization to reduce chance of collisions.

Figure 22:
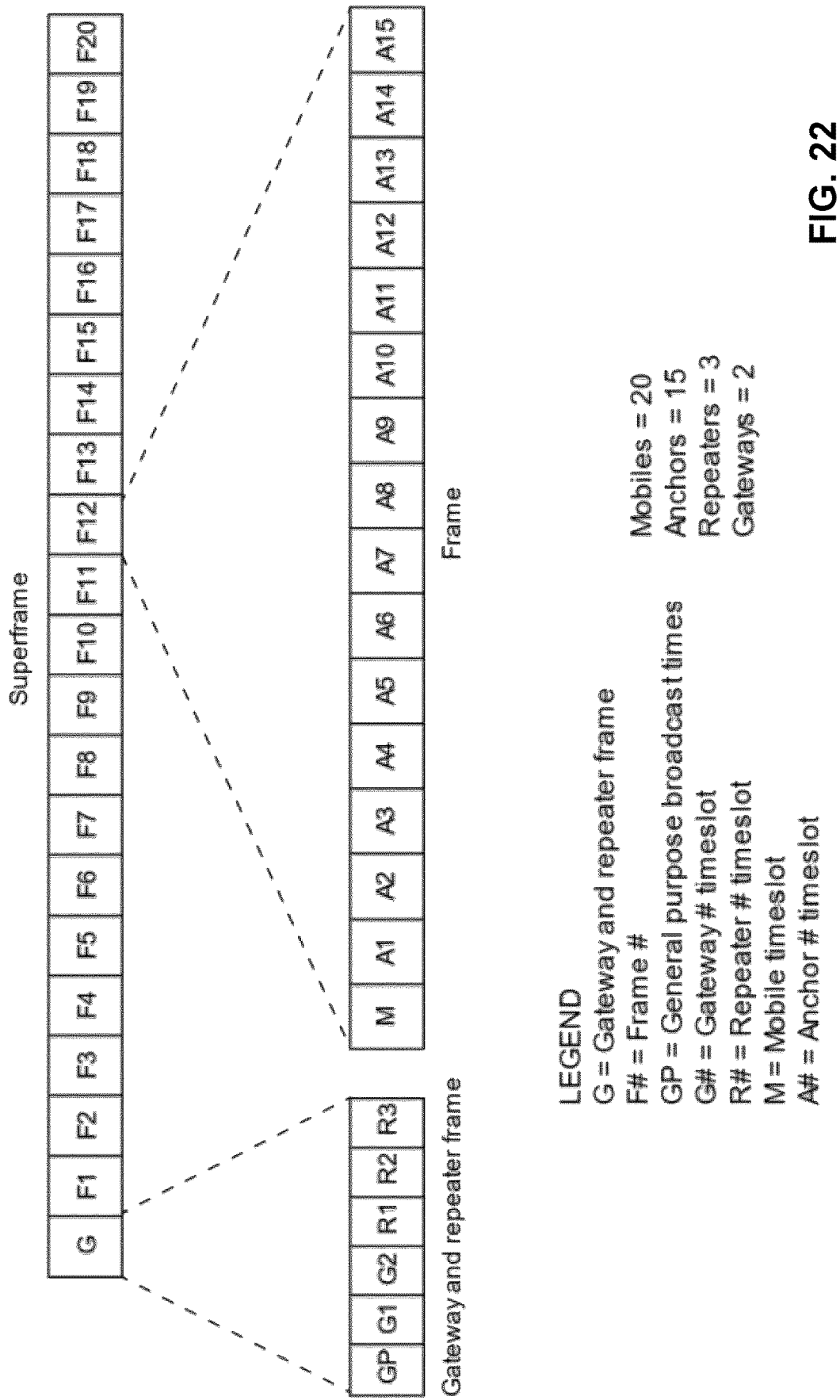
FIG. 22 is a schematic diagram showing the radio protocol frame definition.
Figure 24:
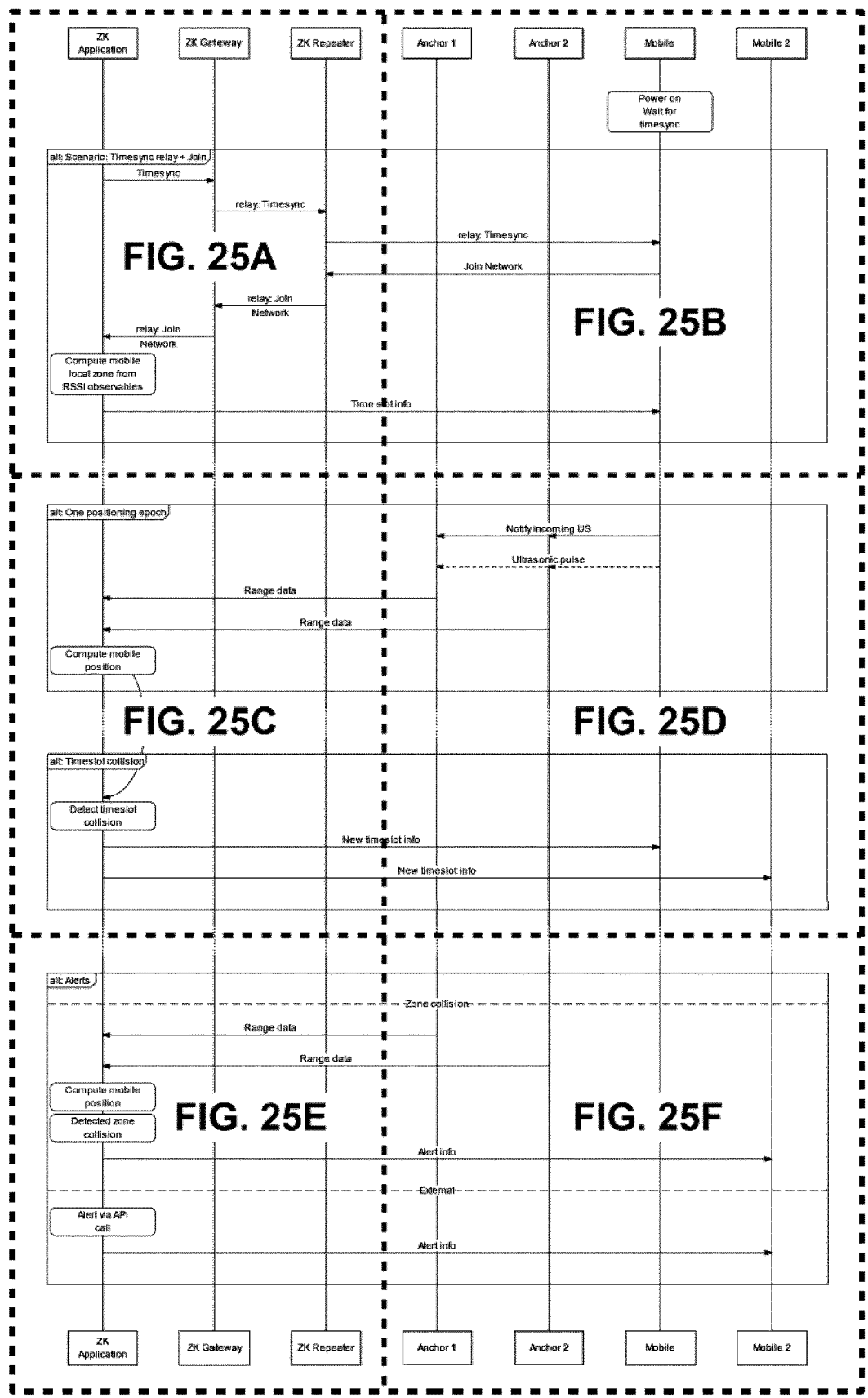
FIGS. 24 and 25A to 25F show scenario sequence diagrams.
Figure 25A:
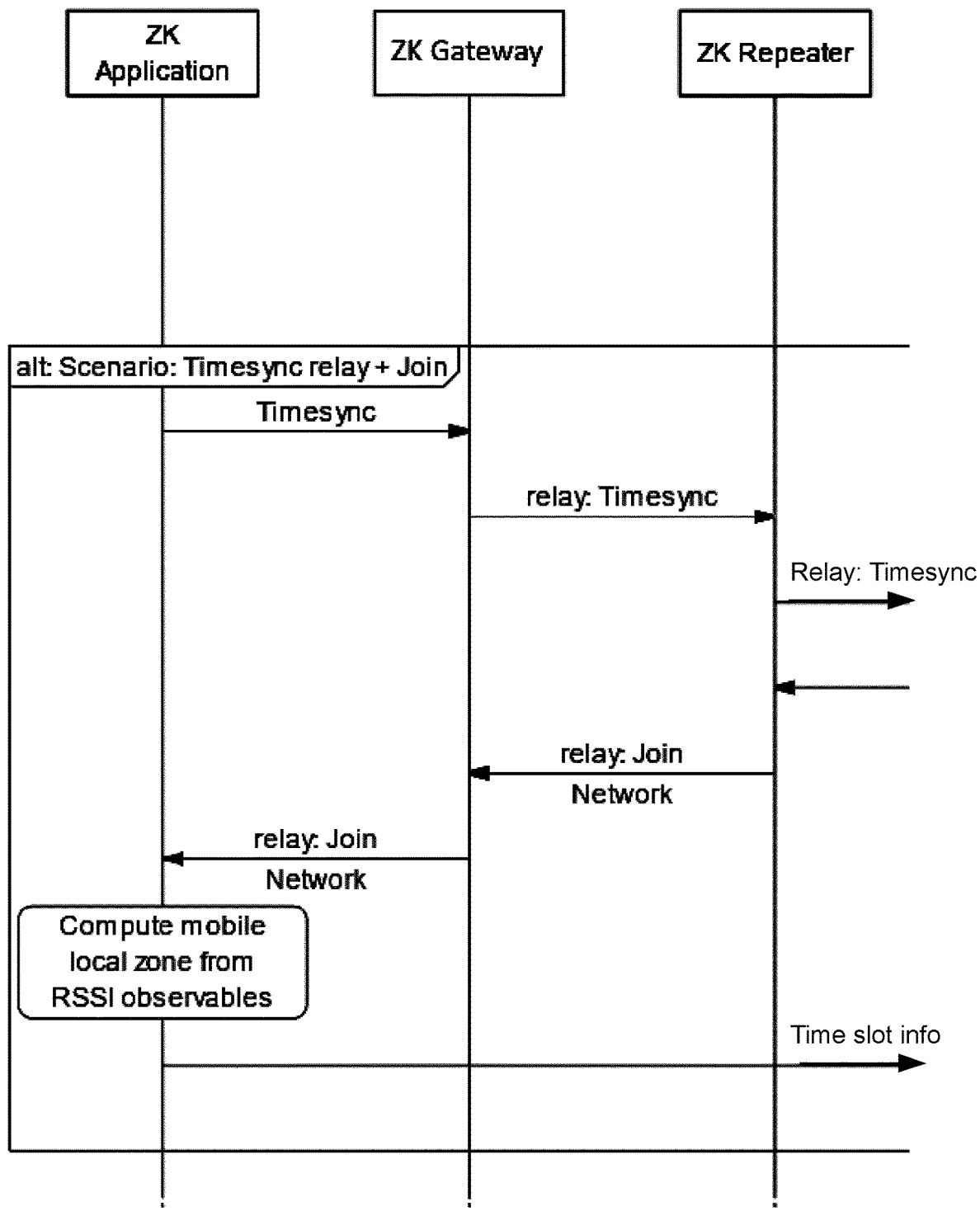
Figure 25B:
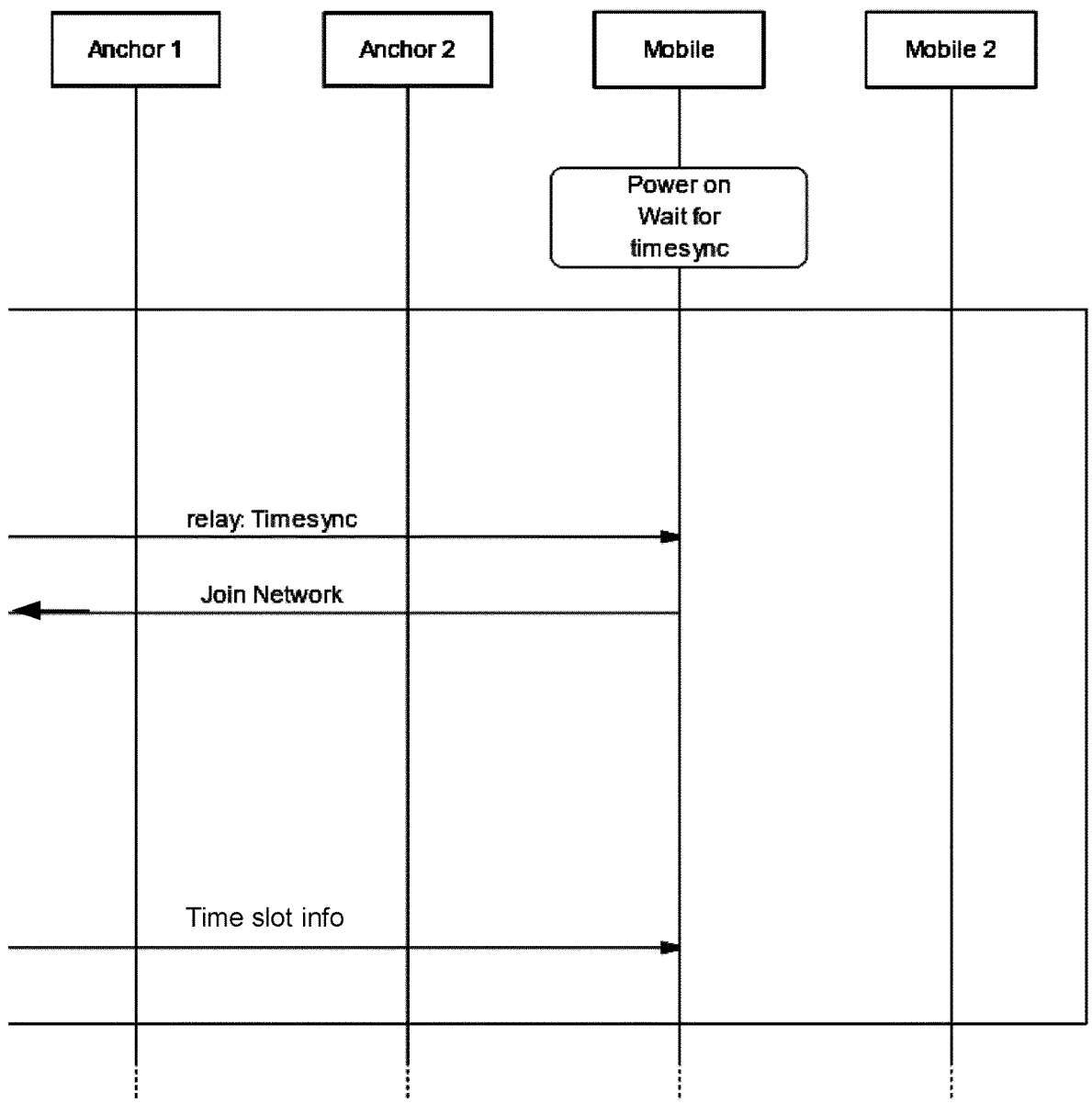
Figure 25C:
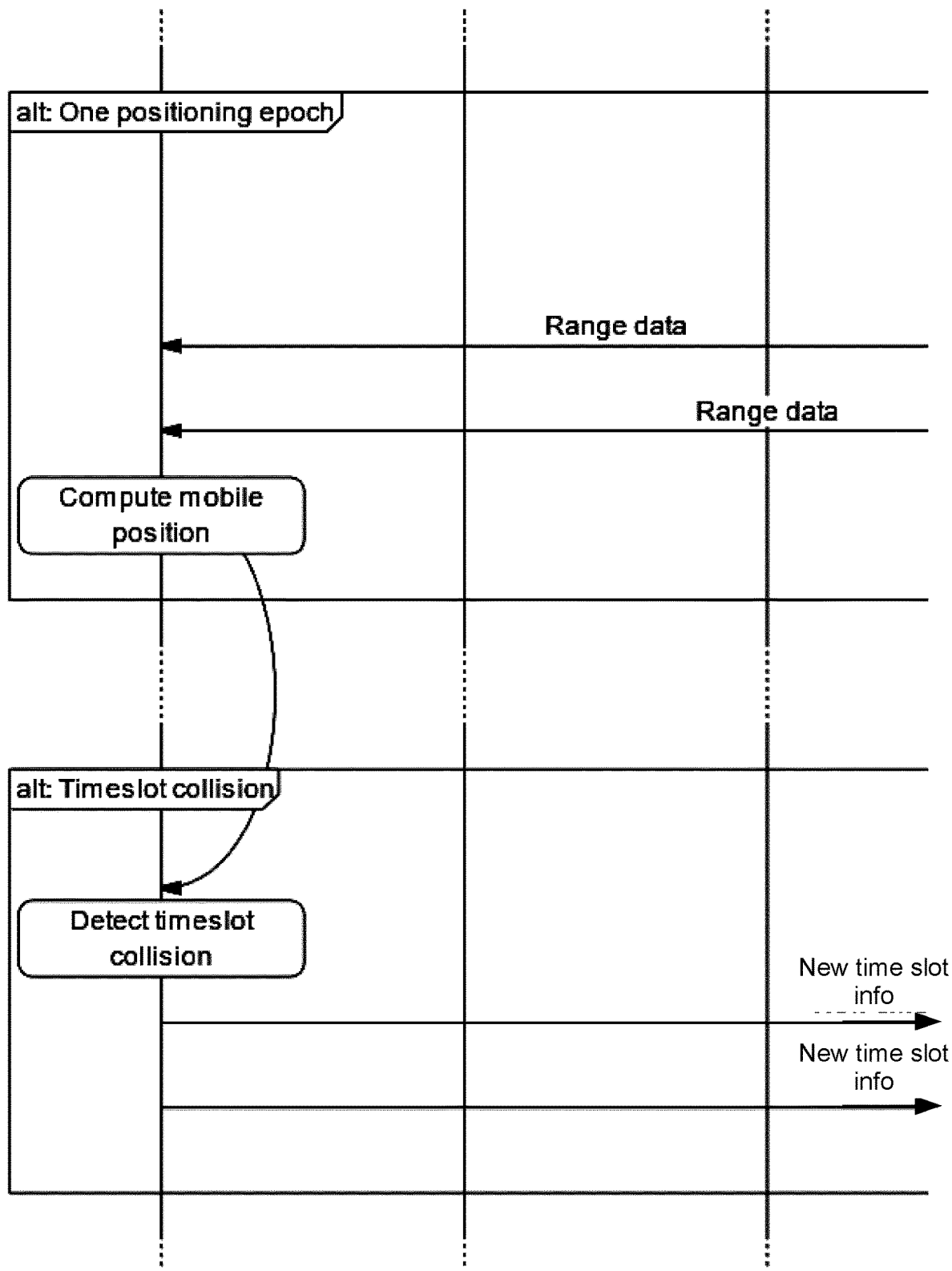
Figure 25D:
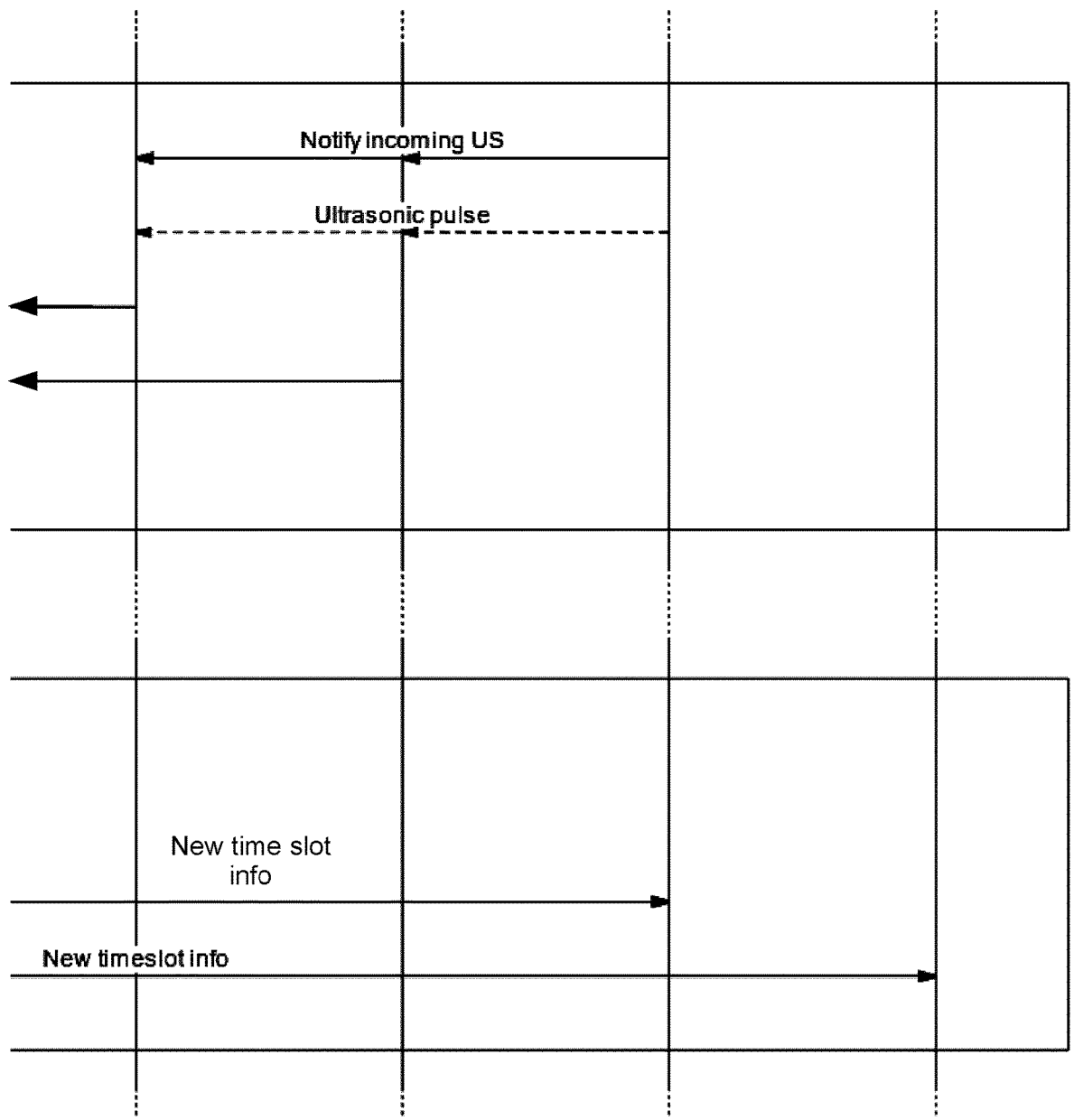
Figure 25E:
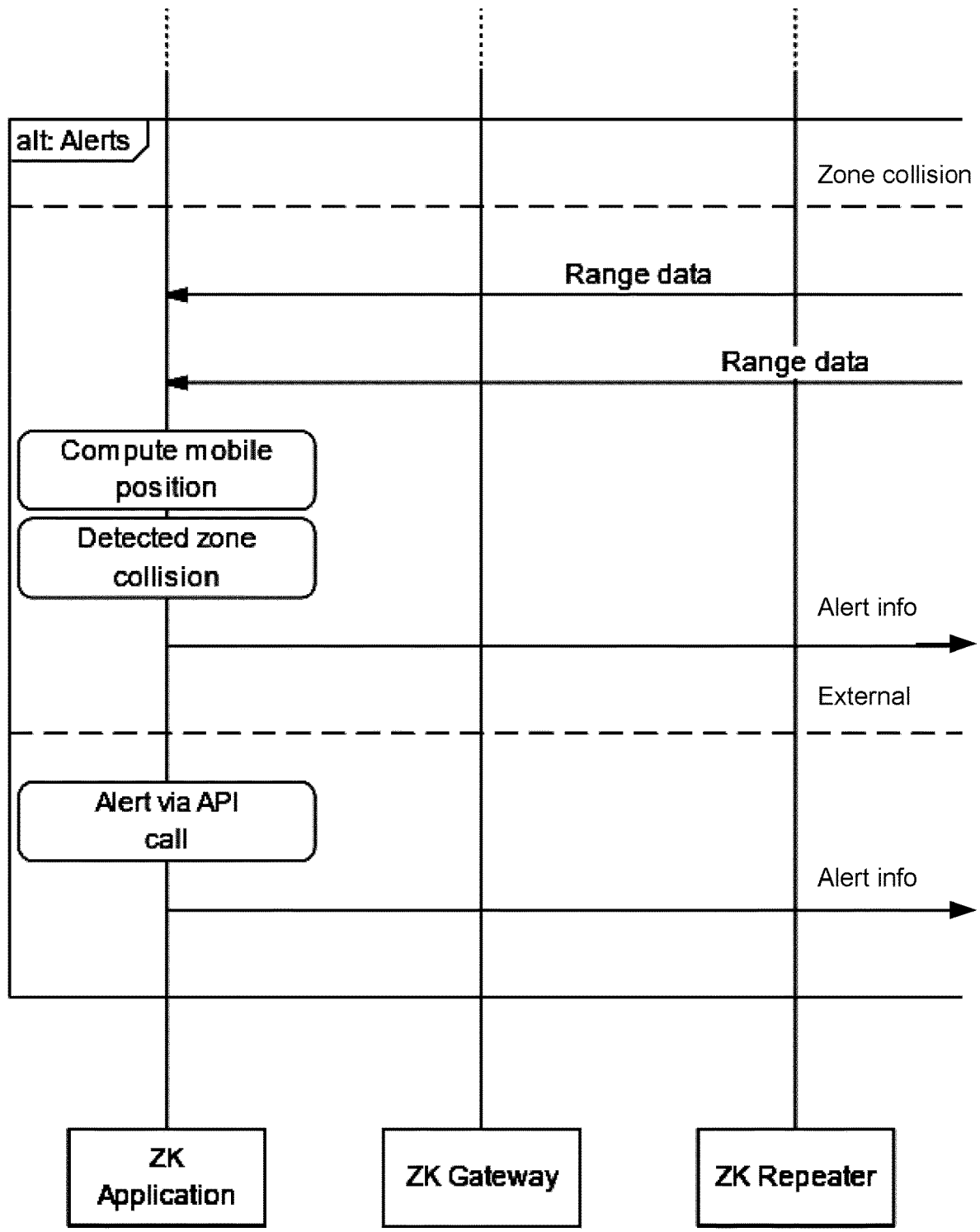
Figure 25F:
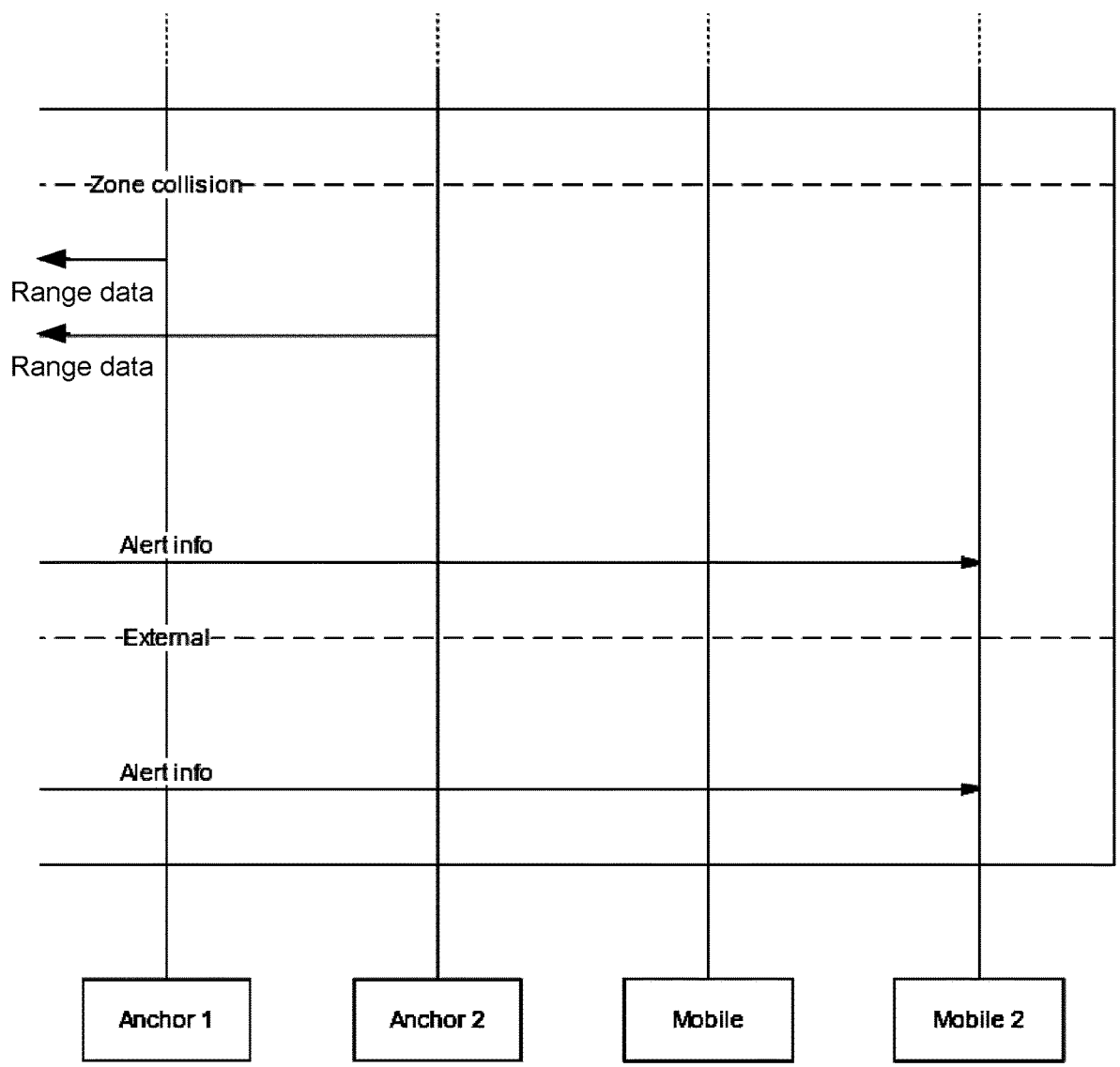

FIG. 22 shows the radio protocol frame definition. Each type of timeslot may be kept consistent in length; however, it may not be not necessary that different timeslots types within the superframe are the same. The tuning of timeslot widths is best accomplished experimentally or through highly realistic simulation. Longer timeslots may be broken up into narrow timeslots and interleaved through the superframe to optimize communication latency.

VI. Repeater Network Radio Protocol

Figure 23:
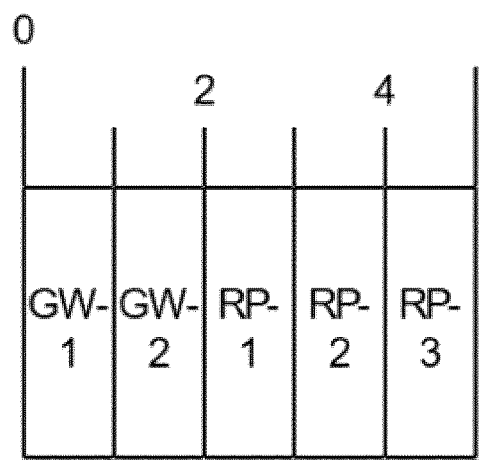
FIG. 23 shows timeslots for radio repeater network.

FIG. 23 shows timeslots for the radio repeater network. There is one frame, which is divided into N timeslots, where N is the number of repeaters and gateways on the system. Timeslot width may to be adjustable to strike a balance of throughput and latency, depending on the deployment use-case. A smaller time slot may provide lower latency, as a repeater may not have to wait as long to transmit data. The bandwidth of each slot is reduced, and more time is lost to the overhead of over-the-air protocol.

FIGS. 24 and 25A to 25F show the scenario sequence diagrams.

VII. Decentralized System Architecture (Variant B2)

By definition, a decentralized architecture problem is an imperfect information problem. As is the case with all imperfect information problems, the architecture described herein may not be infallible in all scenarios. However, a well-conceived solution may provide statistically acceptable performance under certain constraints for the target use-case.

The limited information problem in the architecture manifests as one main challenge; neighboring anchor nodes may not be aware of all nodes on the system, however, must appropriately provision channel time slots to mobile nodes without causing collisions with other mobile nodes. Further, the anchors must negotiate a robust and seamless transition from one regional cell of the system to another where further collisions are possible. Channel time must be shared between all nodes within a local radius of each node.

It quickly becomes apparent that under the decentralized model at a certain density of mobile nodes (even with available channel time), no valid solution exists to service all nodes on the system in worst-case scenarios.

VIII. Mono-Channel Extension (Variant A1 & B1)

Both system architectures described above rely on a dual-channel repeater device which alleviates timeslot congestion on the main RF network. A trivial albeit non-optimal solution to maintain the same functionality on a mono-channel network is to simply add reserved repeater timeslots to the superframe. The consequence is a reduced amount of channel time for positioning functions, but this may be an acceptable tradeoff for the reduced hardware complexity in some use-cases.

What is claimed is:

1. A positioning system comprising:
a plurality of reference nodes at unknown positions;
one or more target nodes at unknown positions;
at least one processing unit; and
one or more signal-retransmission nodes each for communication with at least a subset of the plurality of reference nodes, at least a subset of the one or more target nodes, and at least a subset of the at least one processing unit for transmitting positioning related data therebetween;
wherein the plurality of reference nodes and the one or more target nodes are configured for communication with each other via one or more wireless signal sets;
wherein the positioning related data comprises information of the one or more wireless signal sets;
wherein the at least one processing unit is configured for:
collecting positioning related data from the one or more signal-retransmission nodes, and
determining the distances between the plurality of reference nodes and the distance between the target nodes and the plurality of reference nodes, based on the information of the one or more wireless signal sets, and determining the positions of the plurality of reference nodes and the one or more target nodes based on the determined distances.

2. The object-positioning system of claim 1 further comprising:
one or more gateway nodes for communication with at least a subset of the plurality of reference nodes, at least a subset of the signal-retransmission nodes, and the at least one processing unit for populating the object-positioning related data therebetween.

3. An object-positioning system comprising:
a plurality of reference nodes having a coordinate system associated therewith, the plurality of reference nodes located at an unknown positions in said coordinate system;
one or more target nodes at unknown positions in said coordinate system;
at least one processing unit; and
one or more signal-retransmission nodes each for communication with at least a subset of the plurality of reference nodes, at least a subset of the one or more target nodes, and at least a subset of the at least one processing unit for populating object-positioning related data therebetween;
wherein the plurality of reference nodes and the one or more target nodes are configured for communication with each other via one or more wireless signal sets, each wireless signal set comprising at least a first-speed signal having a first transmission speed and a second-speed signal having a second transmission speed, and the first transmission speed being higher than the second transmission speed;
wherein the object-positioning related data comprises information of the one or more wireless signal sets;
wherein the at least one processing unit is configured for:
collecting object-positioning related data from the one or more signal-retransmission nodes,
determining the distances between the plurality of reference nodes and the distance between the target nodes and the plurality of reference nodes, based on the time difference, obtained from the information of the one or more wireless signal sets, between the receiving time of the first-speed signal and the receiving time of the second-speed signal of each wireless signal set, and
determining the positions of the plurality of reference nodes and the one or more target nodes based on the determined distances.

4. The object-positioning system of claim 3 further comprising:
one or more gateway nodes for communication with at least a subset of the plurality of reference nodes, at least a subset of the signal-retransmission nodes, and the at least one processing unit for populating the object-positioning related data therebetween.

* * * * *